US012750603B2

(12) United States Patent
Suzuki

(10) Patent No.: US 12,750,603 B2
(45) Date of Patent: Sep. 29, 2026

(54) IMAGE SENSING DEVICE

(71) Applicant: SK hynix Inc., Gyeonggi-do (KR)

(72) Inventor: Hajime Suzuki, Tokyo (JP)

(73) Assignee: SK hynix Inc., Gyeonggi-do (KR)

( * ) Notice: Subject to any disclaimer, the term of this patent is extended or adjusted under 35 U.S.C. 154(b) by 94 days.

(21) Appl. No.: 18/808,082

(22) Filed: Aug. 19, 2024

(65) Prior Publication Data

US 2025/0080877 A1 Mar. 6, 2025

(30) Foreign Application Priority Data

Aug. 28, 2023 (KR) ........................ 10-2023-0112956

(51) Int. Cl.
*H04N 25/77* (2023.01)
*H04N 25/706* (2023.01)
*H04N 25/711* (2023.01)

(52) U.S. Cl.
CPC ........... *H04N 25/77* (2023.01); *H04N 25/706* (2023.01); *H04N 25/711* (2023.01)

(58) Field of Classification Search
CPC .. H04N 25/711; H04N 25/445; H04N 25/706; H04N 25/77; H04N 25/773
USPC .......................................................... 348/308
See application file for complete search history.

(56) References Cited

U.S. PATENT DOCUMENTS 8,269,872 B2 * 9/2012 Okumura ................ H03M 1/18 348/308
8,426,797 B2 * 4/2013 Aull ....................... H04N 25/57 250/214 R
8,729,448 B1 * 5/2014 Wood ................... H04N 25/772 250/214 R
10,012,534 B2 * 7/2018 Andreou ................... G01J 1/44
11,134,208 B1 * 9/2021 Harris .................... H04N 25/57
2007/0046797 A1 * 3/2007 Kakumoto ............. H04N 25/00 348/294
2007/0222879 A1 * 9/2007 Glenn .................... H04N 25/57 348/E3.018
2009/0237535 A1 * 9/2009 Okumura ................ H03M 1/18 348/294
2010/0149221 A1 * 6/2010 Li ........................ G09G 3/3413 345/690
2011/0235771 A1 * 9/2011 Aull ....................... H04N 25/57 250/214 R
2015/0163429 A1 6/2015 Dai et al.
2017/0131143 A1 * 5/2017 Andreou .............. H04N 25/773
2022/0155153 A1 5/2022 Zhu et al.
2022/0166948 A1 * 5/2022 Kelly ........................ G06T 7/60
2022/0174235 A1 6/2022 Kelly et al.
2022/0303483 A1 * 9/2022 Elsayed ................... H03K 5/01

FOREIGN PATENT DOCUMENTS

JP 2022-037743 A 3/2022

* cited by examiner

*Primary Examiner* — Pritham D Prabhakher
(74) *Attorney, Agent, or Firm* — IP&T GROUP LLP

(57) ABSTRACT

An image sensing device includes a counter configured to generate first count data by counting pulses corresponding to photocharges, a shift register configured to store second count data corresponding to upper digits of the first count data, and an adder configured to sum the second count data and an overflow value indicating whether the first count data has overflowed.

20 Claims, 12 Drawing Sheets

IMAGE SENSING DEVICE

CROSS-REFERENCE TO RELATED APPLICATION

This patent application claims the priority and benefits of Korean patent application No. 10-2023-0112956, filed on Aug. 28, 2023, the disclosure of which is incorporated herein by reference in its entirety.

TECHNICAL FIELD

The technology and embodiments disclosed in this patent application generally relate to an image sensing device capable of obtaining an image of a scene by detecting light.

BACKGROUND

An image sensing device is a device for capturing optical images by converting light into electrical signals using a photosensitive semiconductor material which reacts to light. With the development of automotive, medical, computer and communication industries, the demand for high-performance image sensing devices is increasing in various devices such as smart phones, digital cameras, game machines, IOT (Internet of Things), robots, security cameras and medical micro-cameras.

A pixel, which is a unit circuit that detects light in an image sensing device, can be implemented in various ways depending on the purpose or use of the image sensing device, and miniaturization of the pixel is also emerging as an important issue of the image sensing device as well as the quality of images produced by the image sensing device. In order to improve the quality of images, it is important to increase performance of pixels, but additional space may be required to increase such pixel performance. Since performance of a pixel and the size of a pixel are usually in a trade-off relationship, the importance of system design that can increase the performance of a pixel while minimizing the size of a pixel is increasing.

SUMMARY

Various embodiments of the present disclosure relate to an image sensing device that can increase performance of a pixel as much as possible while minimizing the size of a pixel.

In accordance with an embodiment of the present disclosure, an image sensing device may include a counter configured to generate first count data by counting pulses corresponding to photocharges; a shift register configured to store second count data corresponding to upper digits of the first count data; and an adder configured to sum the second count data and an overflow value indicating whether the first count data has overflowed.

In accordance with another embodiment of the present disclosure, an image sensing device may include a counter configured to generate first count data by counting pulses corresponding to photocharges; and an adder configured to generate an overflow value indicating whether the first count data has overflowed, and add the overflow value to second count data corresponding to upper digits of the first count data.

In accordance with another embodiment of the present disclosure, an image sensing device may include a counter configured to generate first count data by counting pulses corresponding to photocharges; and a shift register configured to store second count data corresponding to upper digits of the first count data, receive the first count data after outputting the second count data, and output the received first count data, wherein the second count data refers to data to which an overflow value indicating whether the first count data has overflowed is added.

It is to be understood that both the foregoing general description and the following detailed description of the present disclosure are illustrative and descriptive and are intended to provide further description of the embodiments of the present disclosure as claimed.

BRIEF DESCRIPTION OF THE DRAWINGS

The above and other features and beneficial aspects of the disclosed technology will become readily apparent with reference to the following detailed description when considered in conjunction with the accompanying drawings.

DETAILED DESCRIPTION

Figure 1:
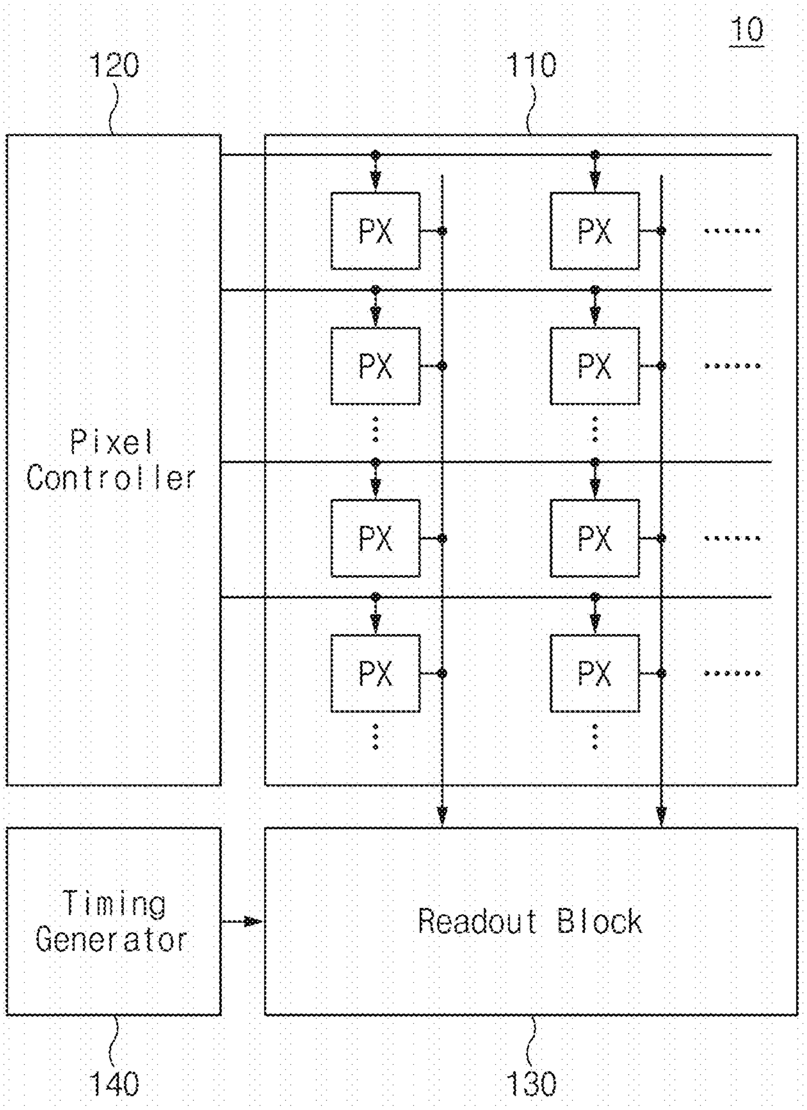
FIG. 1 is a block diagram illustrating an imaging device based on some embodiments of the present disclosure.

This disclosure provides embodiments and examples of an image sensing device capable of obtaining an image of a scene by detecting light, that may be used in configurations to substantially address one or more technical or engineering issues and to mitigate limitations or disadvantages encountered in some other image sensing devices. Some embodiments of the present disclosure relate to an image sensing device that can increase performance of a pixel as much as possible while minimizing the size of a pixel. The present disclosure provides various embodiments of the image sensing device that can significantly reduce the size of a pixel generating pixel data by counting the number of pulses corresponding to photocharges. The present disclosure provides various embodiments of the image sensing device that can reduce the amount of power to be consumed in a pixel array by performing contrast-based downsampling on a pixel cluster including pixels.

Reference will now be made in detail to the embodiments of the present disclosure, examples of which are illustrated in the accompanying drawings. Wherever possible, the same reference numbers will be used throughout the drawings to refer to the same or like parts. While the embodiments are susceptible to various modifications and alternative forms, specific embodiments thereof are shown by way of example in the drawings. However, the present disclosure should not be construed as being limited to the embodiments set forth herein.

Hereinafter, various embodiments will be described with reference to the accompanying drawings. However, it should be understood that the disclosed technology is not limited to specific embodiments, but includes various modifications, equivalents and/or alternatives of the embodiments. The embodiments of the present disclosure may provide a variety of effects capable of being directly or indirectly recognized through the disclosed technology.

FIG. 1 is a block diagram illustrating an imaging device 10 based on some embodiments of the present disclosure.

Referring to FIG. 1, the imaging device 10 may refer to a device, for example, a digital still camera for photographing still images or a digital video camera for photographing moving images. For example, the imaging device 10 may be implemented as a Digital Single Lens Reflex (DSLR) camera, a mirrorless camera, or a smartphone, and other similar devices. The imaging device 10 may include a device having both a lens and an image pickup element such that the device can capture (or photograph) a target object and can thus create an image of the target object.

In some embodiments, the imaging device may include not only the image sensing device 10, but also an image signal processor that performs image processing (e.g., demosaicing, noise reduction, etc.) on image data generated by the image sensing device 10.

The image sensing device 10 may be or include a complementary metal oxide semiconductor image sensor (CIS) for converting an optical signal into an electrical signal. The image sensing device 10 may include a pixel array 110, a pixel controller 120, a readout block 130, and a timing generator 140.

The pixel array 110 may include a plurality of pixels (PXs) consecutively arranged in a two-dimensional (2D) matrix structure (e.g., consecutively arranged in a column direction and/or a row direction). Each of the plurality of pixels (PXs) may detect incident light, and may generate pixel data under control of the pixel controller 120. Pixel data may refer to data representing the number of photocharges generated in response to the intensity of incident light. A structure of each pixel (PX) and the operation of generating pixel data will hereinafter be described later with reference to FIG. 2.

Pixels (PXs) belonging to one row may receive the same pixel control signal from the pixel controller 120. The pixels (PXs) belonging to one column may be connected to one column line, and may output pixel data to the readout block 130. In some other embodiments, pixels (PXs) belonging to one column may be independently connected to different column lines, and may output pixel data to the readout block 130.

The pixel controller 120 may drive the pixels (PXs) of the pixel array 110 in response to a timing signal output from the timing generator 140. For example, the pixel controller 120 may generate a control signal capable of selecting and controlling pixels (PXs) included in at least one row line from among a plurality of row lines of the pixel array 110.

The readout block 130 may detect pixel data output from the pixel array 110 under control of the timing generator 140, and may output the detected pixel data as image data. Specifically, the readout block 130 may include a sense amplifier configured to amplify and output a voltage level of each bit of pixel data, a memory configured to temporarily store the pixel data output from the sense amplifier, and/or an output interface configured to output the resultant pixel data to an external device (e.g., an image signal processor) under control of the timing generator 140.

The timing generator 140 may generate a timing signal to control the operations of the pixel controller 120 and the readout block 130. In some embodiments, the timing generator 140 may generate a timing signal in response to a request from the image signal processor. In some embodiments, the timing generator 140 may include a logic control circuit, a phase lock loop (PLL) circuit, a timing control circuit, a communication interface circuit and others.

Figure 2:
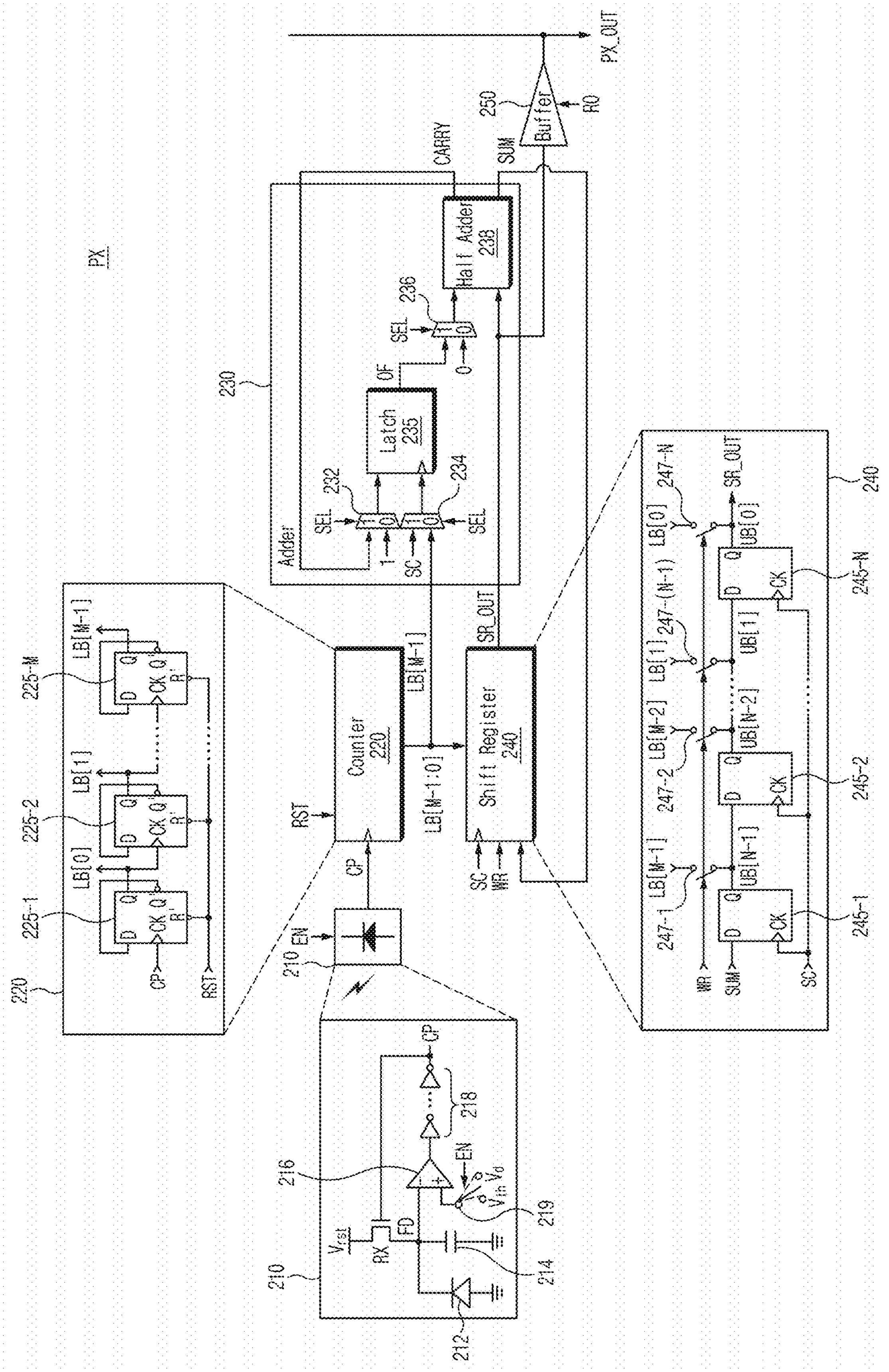
FIG. 2 is a circuit diagram illustrating a pixel shown in FIG. 1 based on some embodiments of the present disclosure.

FIG. 2 is a circuit diagram illustrating a pixel (PX) shown in FIG. 1 based on some embodiments of the present disclosure.

Referring to FIG. 2, the pixel (PX) may correspond to one example of each pixel included in the pixel array 110 shown in FIG. 1.

The pixel (PX) may include a light sensor 210, a counter 220, an adder 230, a shift register 240, and a buffer 250.

The light sensor 210 may be activated or deactivated in response to an activation control signal (EN). The activated light sensor 210 may detect incident light to generate photocharges, and may generate a charge pulse signal (CP) serving as a pulse signal corresponding to the number of the generated photocharges.

In some embodiments, the light sensor 210 may be implemented as a photomultiplier. For example, the light sensor 210 may include a photoelectric conversion element 212, a capacitor 214, a comparator 216, a delay circuit 218, a reset transistor (RX), and an activation switch 219.

The photoelectric conversion element 212 may generate photocharges corresponding to the intensity of incident light. The photoelectric conversion element 212 may be implemented as a photodiode or a single photon avalanche diode (SPAD), but other implementations are also possible. The photoelectric conversion element 212 may be connected between a ground terminal and a floating diffusion node (FD).

The capacitor 214 may provide a predetermined capacitance to the floating diffusion node (FD) so that photocharges generated by the photoelectric conversion element 212 can be accumulated in the floating diffusion node FD. The capacitor 214 may be connected between the floating diffusion node (FD) and the ground terminal.

The comparator 216 may include an inverting input terminal connected to the floating diffusion node (FD) and a non-inverting input terminal connected to the activation switch 219, and may output a voltage according to a result of comparing a voltage input to the inverting input terminal with a voltage input to the non-inverting input terminal. When the voltage input to the inverting input terminal is higher than the voltage input to the non-inverting input terminal, the voltage output from the comparator 216 may have a logic low level. Conversely, when the voltage input to the inverting input terminal is lower than the voltage input to the non-inverting input terminal, the voltage output from the comparator 216 may have a logic high level.

The delay circuit 218 may delay the voltage output from the comparator 216, and may output the delayed voltage as a charge pulse signal CP. The delay circuit 218 may be implemented as an inverter chain including a plurality of inverters. A pulse width of the charge pulse signal CP may be determined depending on the number of inverters.

The reset transistor (RX) may be connected between a reset voltage (Vrst) and the floating diffusion node (FD), and may receive the charge pulse signal (CP) through a gate terminal thereof. The reset transistor (RX) may be turned on according to a voltage level of the charge pulse signal (CP) to reset the floating diffusion node (FD) to the reset voltage (Vrst).

One terminal of the activation switch 219 may be connected to the non-inverting input terminal of the comparator 216, and the other terminal of the activation switch 219 may be connected to a threshold voltage (Vth) terminal or a deactivation voltage (Vd) terminal. The other terminal of the activation switch 219 may be selectively connected to the threshold voltage (Vth) terminal or the deactivation voltage (Vd) terminal in response to the activation control signal (EN). When the activation control signal (EN) is at a logic high level, the activation switch 219 may connect the other terminal thereof to the threshold voltage (Vth) terminal. When the activation control signal (EN) is at a logic low level, the activation switch 219 may connect the other terminal thereof to the deactivation voltage (Vd) terminal.

Here, the threshold voltage (Vth) may be determined to be lower than the voltage of the floating diffusion node (FD) where photocharges are not accumulated, and may be determined to be higher than the voltage of the floating diffusion node (FD) where photocharges are accumulated. That is, when the other terminal of the activation switch 219 is connected to the threshold voltage (Vth) terminal, the light sensor 210 is activated so that the charge pulse signal (CP) having a pulse shape can be generated depending on whether photocharges are accumulated in the floating diffusion node (FD).

The deactivation voltage (Vd) may be determined to be lower than the voltage of the floating diffusion node (FD) where photocharges are accumulated. That is, when the other terminal of the activation switch 219 is connected to the deactivation voltage (Vd) terminal, the light sensor 210 is deactivated so that the charge pulse signal (CP) having a logic low level can be generated regardless of whether photocharges are accumulated in the floating diffusion node (FD).

To describe the operation when the light sensor 210 is activated, when photocharges are not generated by the photoelectric conversion element 212, photocharges may not be accumulated in the floating diffusion node (FD). At this time, since the voltage of the floating diffusion node (FD) is higher than the threshold voltage (Vth), the voltage output from the comparator 216 and the charge pulse signal (CP) can be maintained at a logic low level. When photocharges are generated by the photoelectric conversion element 212, the voltage of the floating diffusion node (FD) where the photocharges are accumulated becomes lower than the threshold voltage (Vth), so that the voltage output from the comparator 216 may transition to a logic high level. The logic high level voltage may be output as a charge pulse signal (CP) after lapse of a predetermined time through the delay circuit 218. In addition, as the charge pulse signal (CP) transitions to a logic high level, the reset transistor RX is turned on and the floating diffusion node (FD) can be reset to the reset voltage (Vrst). Since the voltage of the reset floating diffusion node FD is higher than the threshold voltage (Vth), the voltage output from the comparator 216 may transition from a logic high level to a logic low level. The logic low level voltage may be output as a charge pulse signal (CP) after lapse of a predetermined time through the delay circuit 218. As described above, the light sensor 210 may generate the charge pulse signal (CP) having pulses corresponding to photocharges generated by sensing the incident light. Here, the number of photocharges that generate pulses may be one '1', but other implementations are also possible.

The counter 220 may generate and store first count data (LB) by counting the pulses of the charge pulse signal (CP).

The counter 220 may include a plurality of flip-flops, the number of which is equal to the number of bits included in the first count data (LB). As shown in FIG. 2, the first count data (LB) may include M bits (LB[M−1]~LB[0]), where M is an integer of 2 or greater, and the counter 220 may include first to M-th counter flip-flops (225-1~225-M) respectively corresponding to the M bits (LB[M−1]~LB[0]).

The first counter flip-flop 225-1 may include a clock terminal (CK) through which a charge pulse signal (CP) is received, an input terminal (D) and an inverting output terminal (Q') connected to each other, an output terminal (Q) through which the first bit (LB[0]) of the first count data (LB) is output, and a reset terminal (R') through which the counter reset signal (RST) is received. The reset terminal (R') may transmit a signal obtained by inverting the counter reset signal (RST) to the inside of the first counter flip-flop 225-1. The first counter flip-flop 225-1 may store the first bit (LB[0]) of the first count data (LB), may detect an edge (e.g., a falling edge) of the charge pulse signal (CP), may change a value of the currently stored first bit (LB[0]) to another, and may store and output the changed value.

The second counter flip-flop 225-2 may include a clock terminal (CK) through which the first bit (LB[0]) of the first count data (LB) is received, an input terminal (D) and an inverting output terminal (Q') connected to each other, an output terminal (Q) through which the second bit (LB[1]) of the first count data (LB) is output, and a reset terminal (R') through which the counter reset signal (RST) is received. The second counter flip-flop 225-2 may store the second bit (LB[1]) of the first count data (LB), may detect an edge (e.g., a falling edge) of the first bit (LB[0]) of the first count data (LB), may change a value of the currently stored second bit (LB[1]) to another, and may store and output the changed value. That is, when the value of the first bit (LB[0]) transitions from '1' to '0', the second bit (LB[1]) stored in the second counter flip-flop 225-2 may be changed.

Each of the third to M-th counter flip-flops (225-3~225-M) may operate in substantially the same manner as the second counter flip-flop 225-2, and may be sequentially connected to the second counter flip-flop 225-2.

The counter 220 may increase the first count data (LB) by '1' by counting the number of pulses of the charge pulse signal (CP). The first bit (LB[0]) may be the least significant bit (LSB) of the first count data (LB), and the M-th bit (LB[M−1]) may be the most significant bit (MSB) of the first count data (LB). From among the plurality of bits from the first bit (LB[0]) to the M-th bit (LB[M−1]), as the order of a target bit becomes closer to the M-th order, the target bit may serve as an upper bit having a higher order.

Each of the first to M-th counter flip-flops (225-1~225-M) may be reset in response to the counter reset signal (RST). Here, the expression "reset" may mean signal initialization to a logic low level.

The adder 230 stores an overflow value (OF) indicating whether the first count data (LB) has overflowed, and then outputs a result (SUM) of summation of the second count data (UB) stored in the shift register 240 and the overflow value (OF). Here, the overflow of the first count data (LB) may mean that the M-th bit (LB[M−1]) of the first count data (LB) transitions from a logic high level to a logic low level. The second count data (UB) may constitute count data corresponding to pixel data together with the first count data (LB). The first count data (LB) may correspond to lower digits of the count data, and the second count data (UB) may correspond to upper digits of the count data. The number of bits included in the first count data (LB) may be determined according to the number of counter flip-flops included in the counter 220. The number of bits included in the second count data (UB) may be determined according to the number of register flip-flops included in the shift register 240.

The adder 230 may include a first selector 232, a second selector 234, a latch 235, a third selector 236, and a half-adder 238.

The adder 230 may operate in an addition mode or an overflow mode depending on a mode selection signal (SEL).

When the mode selection signal (SEL) is at a logic high level, the adder 230 may operate in the addition mode. Here, the addition mode may refer to an operation mode in which the sum (SUM) of the second count data (UB) stored in the shift register 240 and the overflow value (OF) is calculated and the resultant sum value (SUM) is re-stored in the shift register 240. At this time, the adder 230 may sequentially add the overflow value (OF) to bits (UB[0]) to the MSB (UB[N−1]), which are output as the second count data (UB).

When the mode selection signal (SEL) is at a logic low level, the adder 230 may operate in an overflow mode. Here, the overflow mode may refer to a mode for performing an operation of creating and storing the overflow value (OF) indicating whether the first count data (LB) has overflowed.

The first selector 232 may output one of a carry value (CARRY) output from the half-adder 238 and a logic high level (e.g., 1) according to the mode selection signal (SEL). When the mode selection signal (SEL) is at a logic high level, the first selector 232 may output the carry value (CARRY). When the mode selection signal (SEL) is at a logic low level, the first selector 232 may output a logic high level.

The second selector 234 may select one of the M-th bit (LB[M−1]) of the first count data (LB) output from the counter 220 and a shift control signal (SC) according to the mode selection signal SEL. When the mode selection signal (SEL) is at a logic high level, the second selector 234 may output the shift control signal (SC). When the mode selection signal (SEL) is at a logic low level, the second selector 234 may output the M-th bit (LB[M−1]) of the first count data (LB). Here, the shift control signal (SC) may be a signal for controlling the operation of shifting the bits stored in the shift register 240, and may also control the addition operation of the adder 230.

The latch 235 may store and output the output signal of the first selector 232 as an overflow value (OF) in response to an edge (e.g., a falling edge) of the output signal of the second selector 234. When the mode selection signal (SEL) is at a logic high level, the latch 235 may store a carry value (CARRY) as the overflow value (OF) in response to the edge of the shift control signal (SC). When the mode selection signal (SEL) is at a logic low level, the latch 235 may store a value of '1' as the overflow value (OF) in response to the edge of the M-th bit (LB[M−1]).

In some embodiments, when the M-th bit (LB[M−1]) is at a logic high level during a time period in which the mode selection signal (SEL) is at a logic low level, the latch 235 may receive the output value '1' of the first selector 232. Thereafter, the output signal of the second selector 234 at the logic high level of the mode selection signal (SEL) may transition from a logic high level of the M-th bit (LB[M−1]) to a logic low level of the shift control signal (SC). In response to such transition, the output value '1' of the first selector 232 may be stored as an overflow value (OF).

The third selector 236 may output one of the overflow value (OF) output from the latch 235 and a logic low level (e.g., 0) according to the mode selection signal (SEL). When the mode selection signal (SEL) is at a logic high level, the third selector 236 may output the overflow value (OF). When the mode selection signal (SEL) is at a logic low level, the third selector 236 may output a logic low level.

The half-adder 238 may sum an output signal of the third selector 236 and an output signal (SR_OUT) of the shift register 240 and may output a carry value (CARRY) and the sum value (SUM) based on the sum value.

For example, when the bit corresponding to the output of the third selector 236 is zero '0' and the output signal (SR_OUT) of the shift register 240 is '1', the carry value (CARRY) may be zero '0' and the sum value (SUM) may be '1'. In addition, when the bit corresponding to the output of the third selector 236 is '1' and the output signal (SR_OUT) of the shift register 240 is '1', the carry value (CARRY) may be '1' and the sum value (SUM) may be zero '0'.

The shift register 240 may store the second count data (UB), which is a result of summing the M bits (LB[M−1:0]) of the first count data (LB) being sequentially generated. In addition, the shift register 240 may output the second count data (UB) through the buffer 250, may receive the first count data (LB) from the counter 220, may temporarily store the received first count data (LB), and may output the stored first count data (LB) through the buffer 250. That is, the shift register 240 not only operates as a memory used to generate and store the second count data (UB), but also operates as a serializer for transmitting the first count data (LB) to the outside.

The shift register 240 may include a plurality of flip-flops, the number of which is equal to the number of bits included in the second count data (UB). As shown in FIG. 2, the second count data (UB) may include N bits (UB[N−1]~UB[0]), where N is an integer of 2 or greater. The shift register 240 may include first to N-th register flip-flops (245-1~245-N) respectively corresponding to N bits (UB[N−1]~UB[0]), and first to N-th register switches (247-1~247-N) respectively corresponding to output signals of the first to N-th register flip-flops (245-1~245-N).

The first register flip-flop 245-1 may include an input terminal (D) through which a sum value (SUM) of the half-adder 238 is received, a clock terminal (CK) through which the shift control signal (SC) is received, and an output terminal (Q) through which the (N−1)-th bit (UB[N−1]) of the second count data (UB) is output. The first register flip-flop 245-1 may store the (N−1)-th bit (UB[N−1]) of the second count data (UB), may detect the edge (e.g., a falling edge) of the shift control signal (SC), may transmit the currently stored bit to the second register flip-flop 245-2, and may store and output a newly input sum value (SUM).

The second register flip-flop 245-2 may include an input terminal (D) through which the output signal of the first register flip-flop 245-1 is received, a clock terminal (CK) through which the shift control signal (SC) is received, and an output terminal (Q) through which the (N−2)-th bit (UB[N−2]) of the second count data (UB) is output. The second register flip-flop 245-2 may store the (N−2)-th bit (UB[N−2]) of the second count data (UB), may detect the edge (e.g., a falling edge) of the shift control signal (SC), may transmit the currently stored bit to the third register flip-flop 245-3, and may store and output the output signal of the first register flip-flop 245-1.

Each of the third to N-th register flip-flops (245-3~245-N) may operate in substantially the same manner as the second register flip-flop 245-2, and may be sequentially connected to the second register flip-flop 245-2. In particular, the output signal of the N-th register flip-flop 245-N may correspond to the output signal (SR_OUT) of the shift register 240.

Each of the first to N-th register switches (247-1~247-N) may be connected between the counter 220 and the output node of each of the first to N-th register flip-flops (245-1~245-N). For example, the first register switch 247-1 may be connected between the counter 220 and the output node of the first register flip-flop 245-1, the second register switch 247-2 may be connected between the counter 220 and the output node of the second register flip-flop 245-2, and the N-th register switch 247-N may be connected between the counter 220 and the output node of the N-th register flip-flop 245-N. For example, the first register switch 247-1 may be connected between the output node of the first register flip-flop 245-1 and the output node of the M-th counter flip-flop 225-M of the counter 220, and may selectively connect the two nodes to each other.

Each of the first to N-th register switches (247-1~247-N) may be opened or closed in response to a write control signal (WR). When the write control signal (WR) is at a logic low level, each of the first to N-th register switches (247-1~247-N) may be opened to separate the output node of the corresponding register flip-flop and the output node of the corresponding counter flip-flop from each other. When the write control signal (WR) is at a logic high level, each of the first to N-th register switches (247-1~247-N) may be short-circuited to connect the output node of the corresponding register flip-flop and the output node of the corresponding counter flip-flop to each other. At this time, the first to M-th bits (LB[0]~LB[M−1]) of the first count data (LB) may be transferred to the output nodes of the first to N-th register flip-flops (245-1~245-N), respectively.

Although the embodiment of FIG. 2 has disclosed an example case in which M and N are equal to each other for convenience of description, other implementations are also possible, and it should be noted that M and N may also be different from each other according to another embodiment. For example, N may be greater than M.

Unlike the first to M-th counter flip-flops (225-1~225-M), each of the first to N-th register flip-flops (245-1~245-N) may not include a reset terminal. The operation for resetting the first to N-th register flip-flops (245-1~245-N) may be implemented by resetting the first to M-th counter flip-flops (225-1~225-M) and transmitting the first to M-th bits (LB[0]~LB[M−1]) of the first count data (LB) to the output nodes of the first to N-th register flip-flops (245-1~245-N) through the first to N-th register switches (247-1~247-N). That is, hardware for performing the reset operation on the first to N-th register flip-flops (245-1~245-N) may be omitted, such that the size of each pixel (PX) can be further reduced.

In response to a readout signal (RO), the buffer 250 may transmit the output signal (SR_OUT) from the shift register 240 to an output line (PX_OUT) of the pixel (PX) through a column line connected to the pixel (PX). When the readout signal (RO) is at a logic low level, the buffer 250 may not transmit the output signal (SR_OUT) from the shift register 240 to the column line. When the readout signal (RO) is at a logic high level, the buffer 250 may transmit the output signal (SR_OUT) from the shift register 240 to the output line (PX_OUT) of the pixel PX through the column line.

Figure 3:
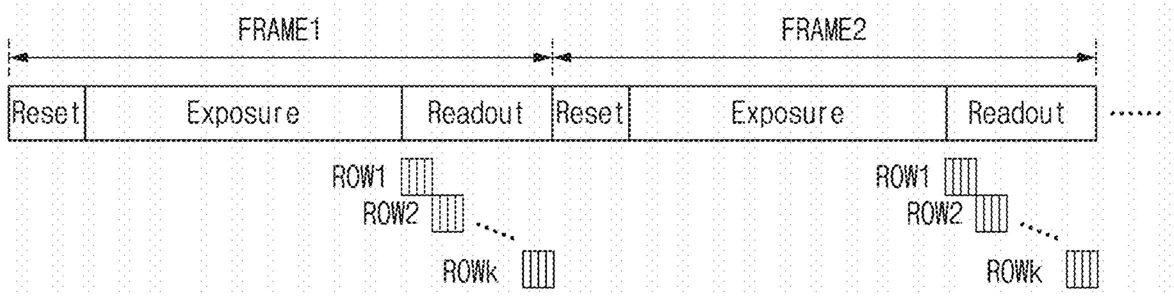
FIG. 3 is a conceptual diagram illustrating operations of pixels for each time period based on some embodiments of the present disclosure.

FIG. 3 is a conceptual diagram illustrating operations of pixels for each time period based on some embodiments of the present disclosure.

Referring to FIG. 3, the pixel (PX) of FIG. 2 may operate on a frame basis. For example, FIG. 3 shows a first frame (FRAME1) and a second frame (FRAME2) scheduled to be sequentially performed. In each of the first frame (FRAME1) and the second frame (FRAME2), the pixel (PX) may generate pixel data for a scene to be captured.

The first frame (FRAME1) may include a reset period (Reset), an exposure period (Exposure), and a readout period (Readout).

In the reset period, an operation of resetting (or initializing) photocharges and data stored in the pixel (PX) may be performed.

In the exposure period, an operation of counting the number of pulses corresponding to photocharges generated by light that is incident upon the pixel (PX) and generating count data (or pixel data) indicating the amount of photocharges (or the intensity of incident light) can be performed.

In the readout period, count data (or pixel data) stored in the pixel (PX) may be output through a column line connected to the pixel (PX). At this time, when pixels (PXs) belonging to one column are connected to one column line, pixels (PXs) included in a plurality of rows (ROW1~ROWk), where 'k' is an integer of 2 or greater, may sequentially output count data on a row basis. Here, the count data may be the same data as the pixel data.

Figure 4:
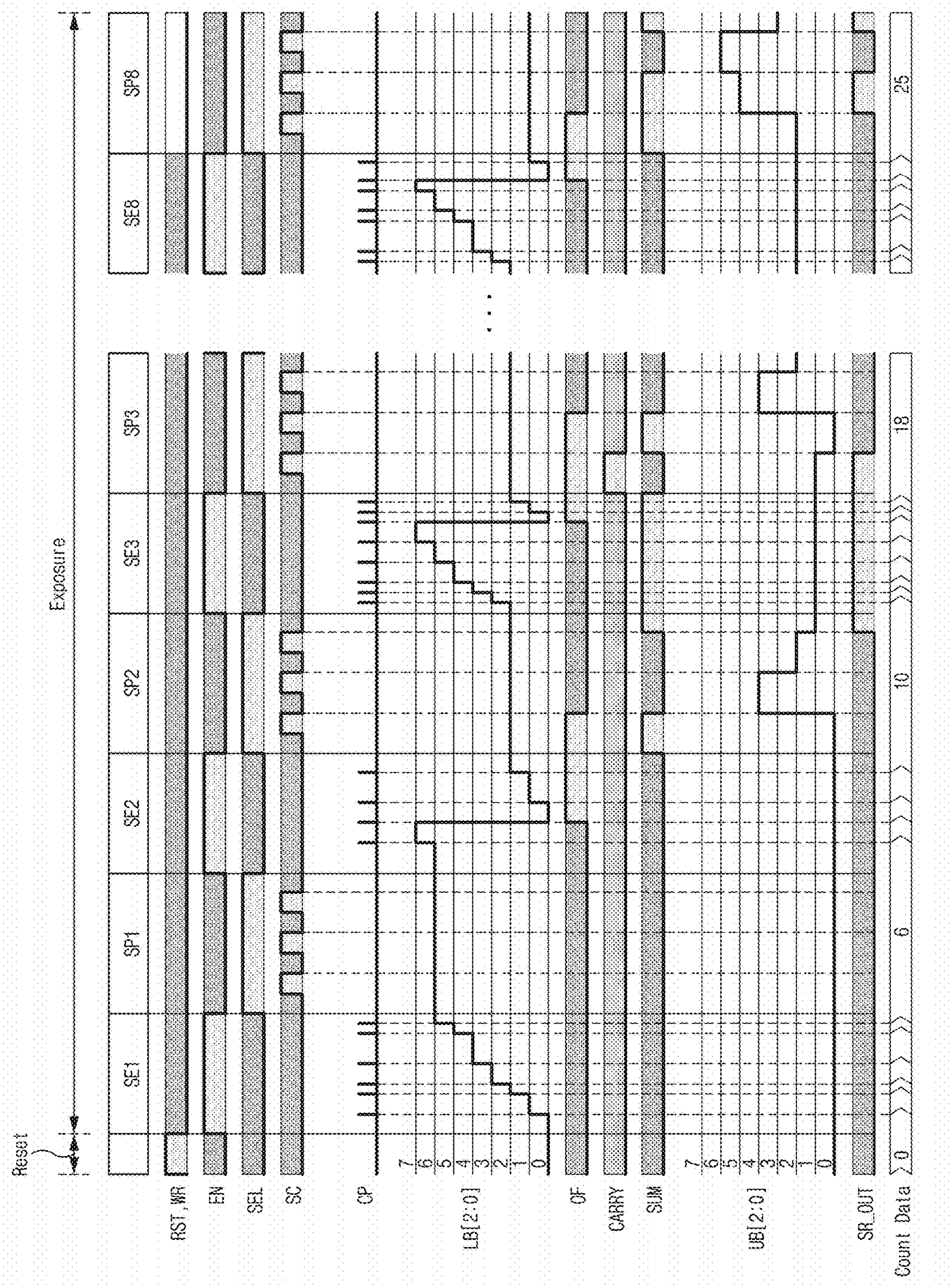
FIG. 4 is a timing diagram illustrating operations of pixels in a reset period and an exposure period shown in FIG. 3 based on some embodiments of the present disclosure.

FIG. 4 is a timing diagram illustrating operations of pixels in the reset period and the exposure period shown in FIG. 3 based on some embodiments of the present disclosure.

Referring to FIG. 4, a reset period (Reset) and an exposure period (Exposure) may refer to the reset period and the exposure section shown in FIG. 3, respectively. In the example of FIG. 4, each of M and N is set to 3, and the count data may include first count data (LB) composed of 3 bits and second count data (UB) composed of 3 bits. That is, count data including 6 bits may represent the result of counting up to 64 pulses. However, the first count data (LB) composed of 3 bits may count up to 8 pulses. Due to the configuration of the pixel (PX), it is impossible for the counting result of more than 8 pulses to be immediately reflected in the second count data (UB).

On the other hand, according to this present embodiment, a logic high level and the value of 1 may be used interchangeably, and a logic low level and the value of zero '0' may also be used interchangeably as needed.

In some embodiments, the exposure period may include a plurality of sub-exposure sections and a plurality of suspend sections subsequent to the sub-exposure sections. In the example of FIG. 4, the exposure period may include eight sub-exposure sections (SE1~SE8) and eight suspend sections (SP1~SP8) so that up to 64 pulses can be counted.

First, in the reset period, each of the counter reset signal (RST) and the write control signal (WR) may have a logic high level, and each of the activation control signal (EN), the mode selection signal (SEL), and the shift control signal (SC) may have a logic low level. Accordingly, the first and second count data (LB, UB), the overflow value (OF), the carry value (CARRY), and a summation value (SUM) stored in the pixel (PX) may be initialized to a logic low level.

In each of the sub-exposure sections (SE1~SE8), the counter 220 may count pulses of the charge pulse signal (CP) output from the light sensor 210 to generate and store the first count data LB, and the adder 230 may generate and store the overflow value (OF) indicating whether the first count data (LB) has overflowed (i.e., whether the third bit (LB[2]) of the first count data (LB) transitions from '1' to '0').

In each of the suspend sections (SP1~SP8), the operation of the counter 220 may be stopped (or suspended), and the adder 230 may calculate the sum of the second count data (UB) stored in the shift register 240 and the overflow value (OF), and may store the second count data corresponding to the result of summation to the shift register 240.

In FIG. 4, a pulse of the charge pulse signal (CP) occurs a total of 25 times within a corresponding frame, occurs six times within a first sub-exposure section (SE1), occurs four times within a second sub-exposure section (SE2), occurs eight times in a third sub-exposure section (SE3), and occurs seven times in the fourth sub-exposure section (SE4).

In the first sub-exposure section (SE1), each of the counter reset signal (RST), the write control signal (WR), the mode selection signal (SEL), and the shift control signal (SC) may have a logic low level, and the activation control signal (EN) may have a logic high level.

As the activation control signal (EN) has a logic high level, the light sensor 210 may be activated to detect incident light and may generate the charge pulse signal (CP) having 6 pulses corresponding to the generated photocharges. The counter 220 may count 6 pulses of the charge pulse signal (CP) and increase the first count data (LB) by '1' for each pulse. That is, when the first sub-exposure section (SE1) is completed, the first count data (LB) may have values from an initialization value of '0' to the value of 6.

As the mode selection signal (SEL) has a logic low level, the adder 230 may operate in the overflow mode, and may store the overflow value (OF) indicating whether the first count data (LB) has overflowed. Since the third bit (LB[2]) of the first count data (LB) does not transition from '1' to '0', the overflow value (OF) may be maintained at zero '0'.

In the first suspend section (SP1), each of the counter reset signal (RST), the write control signal (WR), and the activation control signal (EN) may have a logic low level, and the mode selection signal (SEL) may have a logic high level. The shift control signal (SC) may include three pulses. Here, the number of pulses may be equal to the number of bits of the second count data stored in the shift register 240 or may be equal to the number of register flip-flops included in the shift register 240.

As the activation control signal EN has a logic high level, the light sensor 210 may be activated, and the counter 220 can maintain the stored first count data (LB).

As the mode selection signal (SEL) has a logic high level, the adder 230 may operate in the addition mode, and the half-adder 238 of the adder 230 may sum the output signal (SR_OUT) of the shift register 240 and the overflow value (OF), and may output the carry value (CARRY) and the sum value (SUM). Since each of the output signal (SR_OUT) of the shift register 240 and the overflow value (OF) is zero '0', each of the carry value (CARRY) and the sum value (SUM) may be zero '0'.

As the shift control signal (SC) transitions from '0' to '1' at the falling edge of the first pulse of the shift control signal (SC), the carry value (CARRY) may be input to the latch 235 and may output as the overflow value (OF). The first bit (UB[0]) of the second count data (UB) may be reflected in the sum value (SUM) and stored in the first register flip-flop 245-1 of the shift register 240, so that the stored bit may be output as the third bit (UB[2]). In addition, the third bit (UB[2]) and the second bit (UB[1]) respectively stored in the first register flip-flop 245-1 and the second register flip-flop 245-2 of the shift register 240 may be shifted to and stored in the second register flip-flop 245-2 and the third register flip-flop 245-3, respectively.

Not only at the falling edge of the second pulse of the shift control signal (SC), but also at the falling edge of the third pulse of the shift control signal (SC), the operation at the falling edge of the first pulse of the shift control signal (SC) may also be performed in substantially the same manner as in the second and third pulses of the shift control signal (SC). That is, the adder 230 may sequentially perform summation between the overflow value (OF) and the second count data (UB) in the direction from the LSB (e.g., the first bit UB[0]) to the MSB (e.g., the third bit UB[2]) of the second count data (UB). The shift register 240 may sequentially store the sum value (SUM), which is the result of summing the overflow value (OF) and the second count data (UB), and may store the result of summation between the second count data (UB) and the overflow value (OF) as new second count data (UB).

In the first suspend section (SP1), the sum value '0' of the second count data (UB) of zero '0' and the overflow value (OF) of zero '0' may be stored as the second count data (UB) in the shift register 240.

In the following description, the control signals (RST, WR, EN, SEL, SC) generated in each of the sub-exposure sections (SE2~SE8) may have the same waveform as the control signals (RST, WR, EN, SEL, SC) generated in the first sub-exposure section (SE1), and the control signals (RST, WR, EN, SEL, SC) generated in each of the suspend sections (SP2~SP8) may have the same waveform as the control signals (RST, WR, EN, SEL, SC) generated in the first suspend section (SP1). In each sub-exposure section (SE2~SE8), the pixel (PX) may perform substantially the same operation as in the first sub-exposure section (SE1), and in each suspend section (SP2~SP8), the pixel (PX) may perform substantially the same operation as in the first suspend section SP1, and as such redundant descriptions thereof will herein be omitted in the following description of each section below.

In the second sub-exposure section (SE2), the counter 220 may count four pulses of the charge pulse signal (CP) and increase the first count data (LB) by 1 for each pulse. The counter 220 may be initialized after counting two pulses, and may count the remaining two pulses and store the first count data LB of 2.

When the counter 220 is initialized, the third bit (LB[2]) of the first count data (LB) transitions from '1' to '0', so that the overflow value (OF) may change to '1'.

In the second suspend section (SP2), as the mode selection signal (SEL) transitions to a logic high level, the output signal (SR_OUT) of the shift register 240, which is zero '0', and the overflow value (OF), which is '1', are summed so that a carry value (CARRY) may be zero '0' and the sum value (SUM) may be '1'.

In the second suspend section (SP2), according to the shift control signal (SC) including three pulses, the operation of summing the overflow value (OF) of '1' and the second count data (UB) of zero '0' by the adder 230 may be sequentially performed in units of a bit (on a bit basis), so that the sum value '1' of the second count data (UB) of '0' and the overflow value (OF) of '1' may be stored as the second count data (UB) in the shift register 240. Therefore, after such summation is completed, the output signal (SR_OUT) of the shift register 240, which is the first bit (UB[0]), may be '1', and the sum value (SUM) may be '1'.

In the third sub-exposure section (SE3), the counter 220 may count eight pulses of the charge pulse signal (CP) and increase the first count data (LB) by '1' for each pulse. The counter 220 may be initialized after counting 6 pulses, and may count the remaining 2 pulses and store the first count data (LB) of 2.

When the counter 220 is initialized, the third bit (LB[2]) of the first count data (LB) transitions from '1' to '0', so that the overflow value (OF) may change to '1'.

In the third suspend section (SP3), as the mode selection signal (SEL) transitions to a logic high level, the output signal (SR_OUT) of the shift register 240, which is '1', and the overflow value (OF), which is '1', are summed so that the carry value (CARRY) may be '1' and the sum value (SUM) may be '0'.

In the third suspend section (SP3), according to the shift control signal (SC) including three pulses, the operation of summing the overflow value (OF) of '1' and the second count data (UB) of '1' by the adder 230 may be sequentially performed on a bit basis, so that the sum value '2' of the second count data (UB) of '1' and the overflow value (OF) of '1' may be stored as the second count data (UB) in the shift register 240. Therefore, after such summation is completed, the output signal (SR_OUT) of the shift register 240, which is the first bit (UB[0]), may be '0', and the sum value (SUM) may be '0'.

In the example of FIG. 4, no pulses are included in the charge pulse signal (CP) in the fourth to seventh sub-exposure sections (SE4~SE7). Accordingly, data stored in each of the counter 220, the adder 230, and the shift register 240 can be maintained without change.

In the eighth sub-exposure section (SE8), the counter 220 may count seven pulses of the charge pulse signal (CP) and increase the first count data LB by '1' for each pulse. The counter 220 may be initialized after counting 6 pulses, and may count the remaining 1 pulse to store the first count data (LB) of 1.

When the counter 220 is initialized, the third bit (LB[2]) of the first count data (LB) transitions from '1' to '0', so that the overflow value (OF) may change to '1'.

In the eighth suspend section (SP8), as the mode selection signal (SEL) transitions to a logic high level, the output signal (SR_OUT) of the shift register 240, which is zero '0', and the overflow value (OF), which is '1', are summed so that the carry value (CARRY) may be zero '0' and the sum value (SUM) may be '1'.

In the eighth suspend section (SP8), according to the shift control signal (SC) including three pulses, the operation of summing the overflow value (OF) of '1' and the second count data (UB) of '2' by the adder 230 may be sequentially performed on a bit basis, so that the sum value '3' of the second count data (UB) of '2' and the overflow value (OF) of '1' may be stored as the second count data (UB) in the shift register 240. Therefore, after such summation is completed, the output signal (SR_OUT) of the shift register 240, which is the first bit (UB[0]), may be '1', and the sum value (SUM) may be '1'.

Figure 5:
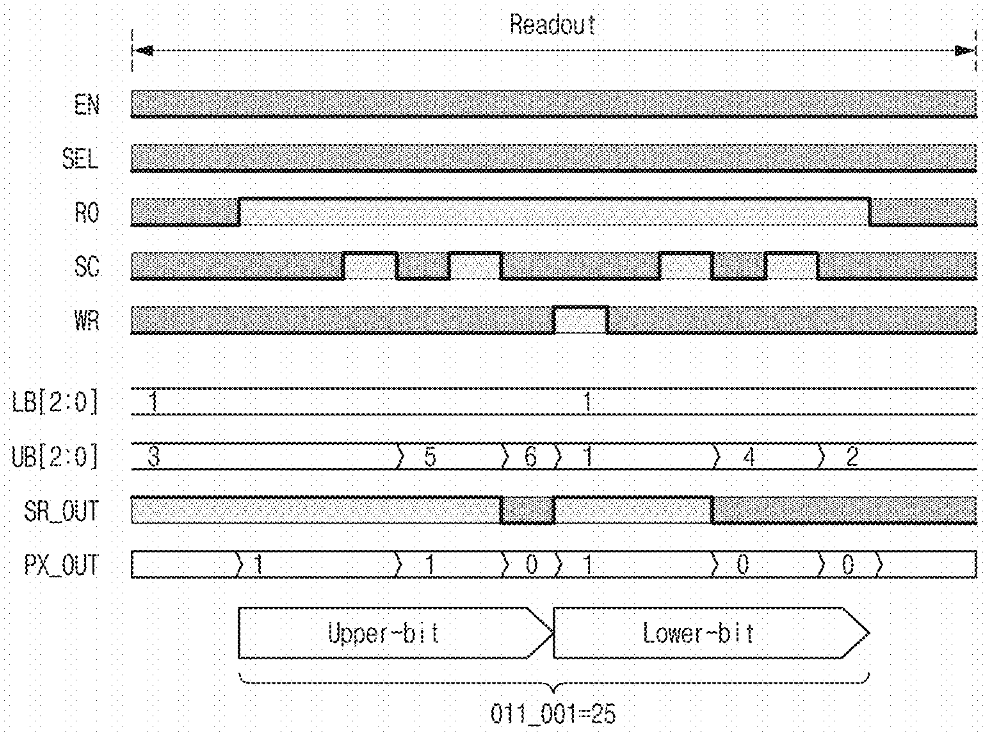
FIG. 5 is a timing diagram illustrating operations of pixels in the readout period shown in FIG. 3 based on some embodiments of the present disclosure.

FIG. 5 is a timing diagram illustrating operations of pixels in the readout period shown in FIG. 3 based on some embodiments of the present disclosure.

Referring to FIG. 5, the readout section (Readout) may refer to the readout section shown in FIG. 3. In addition, the readout section subsequent to the exposure section of FIG. 4 under the same condition as the condition for the (PX) in FIG. 4 will hereinafter be described with reference to FIG. 4.

In the readout period, each of the activation control signal (EN) and the mode selection signal (SEL) may have a logic low level, and the readout signal (RO) may have a logic high level for a predetermined time required to output count data. That is, the second count data (UB) and the first count data (LB) may be sequentially output from the pixel (PX) while the readout signal (RO) has a logic high level.

After the exposure period is completed, under the condition that the output signal (SR_OUT) of the shift register 240, that is, the first bit (UB[0]) is set to '1', when the readout signal (RO) transitions to a logic high level, the output signal (PX_OUT) of the pixel (PX) may be '1' indicating the output signal (SR_OUT) of the shift register 240.

At a first falling edge of the shift control signal (SC), the second count data (UB) stored in the shift register 240 may be shifted on a bit basis, so that the output signal (SR_OUT) of the shift register 240 may be the second bit (UB[1]). Accordingly, the output signal (PX_OUT) of the pixel (PX) may be '1' indicating the output signal (SR_OUT) of the shift register 240.

At a second falling edge of the shift control signal (SC), the second count data (UB) stored in the shift register 240 may be shifted on a bit basis, so that the output signal (SR_OUT) of the shift register 240 may be the third bit (UB[2]). Accordingly, the output signal (PX_OUT) of the pixel (PX) may be '0' indicating the output signal (SR_OUT) of the shift register 240.

Accordingly, the output of the second count data UB may be completed by two pulses included in the shift control signal (SC).

Thereafter, as the write control signal (WR) transitions to a logic high level, the third bit (LB[2]) of the first count data (LB) may be transmitted to the output data (UB[2]) of the first register flip-flop 245-1 of the shift register 240, the second bit (LB[1]) of the first count data (LB) may be transmitted to the output data (UB[1]) of the second register flip-flop 245-2, and the first bit (LB[0]) of the first count data (LB) may be transmitted to the output data (UB[0]) of the third register flip-flop 245-3.

Accordingly, the output signal (PX_OUT) of the pixel (PX) may be zero '0' corresponding to the output signal (SR_OUT) of the shift register 240 corresponding to the first bit (LB[0]) of the first count data (LB).

At a third falling edge of the shift control signal (SC), the first count data (LB) stored in the shift register 240 may be shifted bit by bit, so that the output signal (SR_OUT) of the shift register 240 may be the second bit (LB[1]) of the first count data (LB). Accordingly, the output signal (PX_OUT) of the pixel (PX) may be zero '0' corresponding to the output signal (SR_OUT) of the shift register 240.

At a fourth falling edge of the shift control signal (SC), the first count data (LB) stored in the shift register 240 may be shifted bit by bit, so that the output signal (SR_OUT) of the shift register 240 may be the third bit (LB[2]) of the first count data (LB). Accordingly, the output signal (PX_OUT) of the pixel (PX) may be zero '0' corresponding to the output signal (SR_OUT) of the shift register 240.

As shown in FIG. 5, as the operation of outputting the count data (UB, LB) is performed in the readout period, the first count data (LB) stored in the counter 220 may remain at the value of '1', and the second count data (UB) stored in the shift register 240 may be sequentially changed in the order of 3→5→6→1→4→2.

The output signal (PX_OUT) of the pixel (PX) may be sequentially changed to '1', '1', and '0' indicating the second count data (UB) corresponding to upper bits of the count data, and may be sequentially changed to '1', '0', and '0' indicating the first count data (LB) corresponding to lower bits of the count data.

The output signal (PX_OUT) of the pixel (PX) may be reassembled into 011001 (=25) by an external device (e.g., an image signal processor).

The shift register 240 may perform a refresh operation on the stored second count data (UB).

In some embodiments, the shift register 240 may receive a refresh control signal including three pulses instead of the shift control signal (SC) in the sub-exposure section, and may control the half-adder 238 to sum the value of '0' (that is output from the third selector 236) and each bit of the second count data (UB) and output the sum value. Accordingly, the shift register 240 may prevent the second count data (UB) from being lost due to leakage current generated in each register flip-flop (245-1~245-N) during the sub-exposure section.

In some other embodiments, the shift register 240 of a pixel belonging to another row different from the row where the operation of the readout section is performed may receive a refresh control signal including three pulses in the readout section of the other row, and may control the half-adder 238 to sum the output value '0' of the third selector 236 and each bit of the second count data (UB) and output the sum value. Accordingly, the shift register 240 may prevent the second count data (UB) from being lost due to leakage current occurring in each register flip-flop (245-1~245-N) during the readout period of another row.

Figure 6:
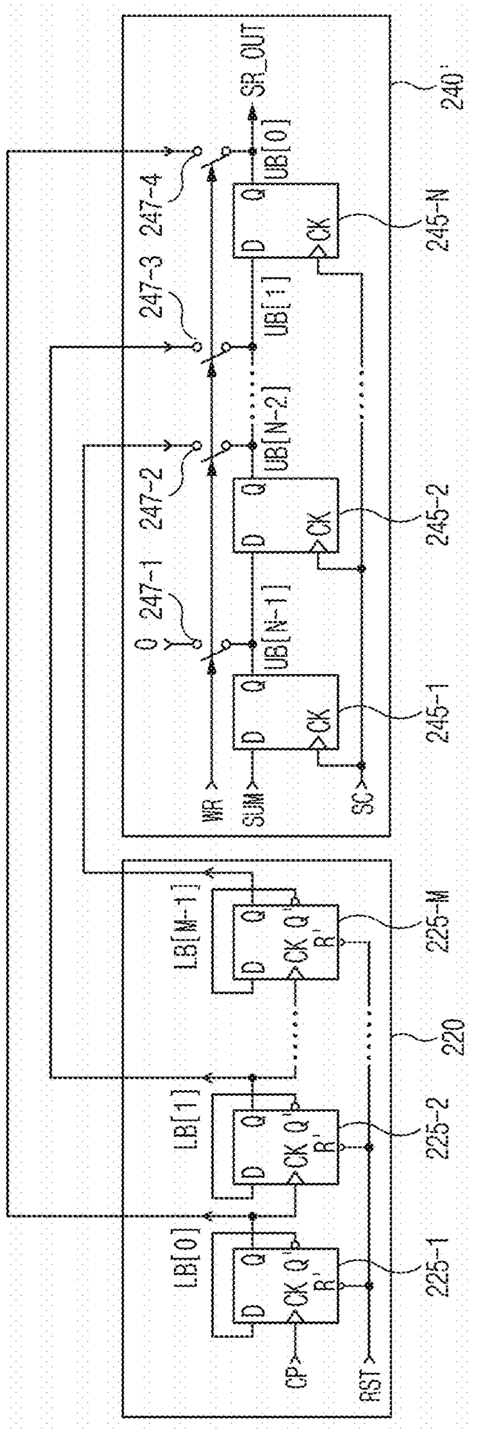
FIG. 6 is a circuit diagram illustrating a shift register shown in FIG. 2 based on some embodiments of the present disclosure.

FIG. 6 is a circuit diagram illustrating a shift register shown in FIG. 2 based on some embodiments of the present disclosure.

Although the embodiment of FIG. 2 illustrates the case in which the number (M) of bits of the first count data (LB) and the number (N) of bits of the second count data (UB) are identical to each other for convenience of description, other implementations are also possible, and the following embodiment of FIG. 6 will hereinafter disclose a case in which the number (M) of bits of the first count data (LB) is higher than the number (N) of bits of the second count data (UB) with reference to the attached drawings.

As shown in FIG. 6, when the number (N) of bits of the second count data (UB) is higher than the number (M) of bits of the first count data (LB) by the value of '1', the number of register flip-flops (245-1~245-N) included in the shift register 240' may be higher than the number of counter flip-flops (225-1~225-M) included in the counter 220 by the value of '1'.

In this case, a fixed input signal (for example, '0') may be applied to one terminal of the first register switch 247-1 connected to the output terminal (UB[N−1]) of the first register flip-flop 245-1 that does not correspond to the counter flip-flops (225-1~225-M) from among the register flip-flops (245-1~245-N).

As described above, the fixed input signal may be applied to the one terminal of the first register switch 247-1. As a result, the operation of initializing the second register flip-flop 245-2 in the reset period and the other operation of inputting and outputting the first count data (LB) to the shift register 240' in the readout period can be normally performed.

In some other embodiments, the fixed input signal may not be applied to one terminal of the first register switch 247-1, but the output signal (LB[M−1]) of the M-th counter flip-flop 225-M may be applied to the one terminal of the first register switch 247-1.

Figure 7:
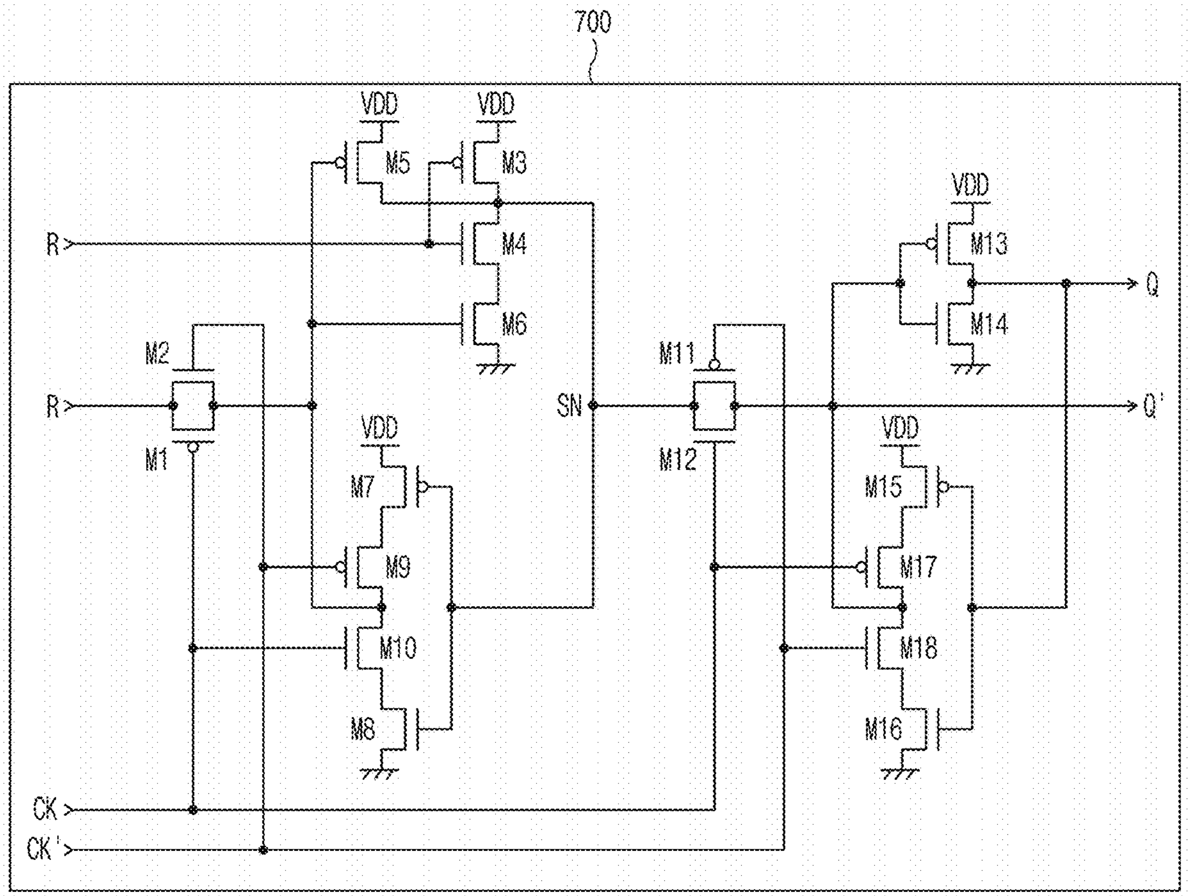
FIG. 7 is a circuit diagram illustrating a counter flip-flop based on some embodiments of the present disclosure.

FIG. 7 is a circuit diagram illustrating a counter flip-flop based on some embodiments of the present disclosure.

Referring to FIG. 7, the counter flip-flop 700 may be an example of each of the counter flip-flops (225-1~225-M) shown in FIG. 2. The power-supply voltage (VDD) and the ground voltage shown in FIGS. 7 to 9 may correspond to a logic high level and a logic low level, respectively.

The counter flip-flop 700 may include first to eighteenth transistors (M1~M18). Here, the first to eighteenth transistors (M1~M18) may be classified into PMOS transistors (M1, M3, M5, M7, M9, M11, M13, M15, M17) and NMOS transistors (M2, M4, M6, M8, M10, M12, M14, M16, M18).

The first and second transistors (M1, M2) may constitute a first transfer gate. Upon receiving an input signal of a logic low level through the clock terminal (CK), each of the first and second transistors (M1, M2) may be short-circuited to transmit data to be input to the input terminal (D) to the other terminal thereof. In addition, upon receiving an input signal of a logic high level through the clock terminal (CK), each of the first and second transistors (M1, M2) may be opened not to transmit data to be input to the input terminal (D) to the other terminal thereof.

The third to sixth transistors (M3~M6) may constitute a NAND gate that performs a NAND operation between first data input to the reset terminal (R) and second data input to the other terminal of the first transfer gate and transmits the result of such NAND operation to a storage node (SN). In more detail, in a time period in which the counter reset signal (RST) is at a logic low level, the NAND gate may invert the data input to the input terminal (D) and store the inverted data in the storage node (SN). In a time period in which the counter reset signal (RST) is at a logic high level, the NAND gate may store data of '1' in the storage node (SN) regardless of the data input to the input terminal (D).

The seventh to tenth transistors (M7~M10) may constitute a first feedback circuit. The first feedback circuit may float the other terminal of the first transfer gate in response to a low-level input signal of the clock terminal (CK). Alternatively, the first feedback circuit may invert data of the storage node (SN) in response to a high-level input signal of the clock terminal (CK), such that the inverted data may be fed back to the other terminal of the first transfer gate.

The eleventh and twelfth transistors (M11, M12) may constitute a second transfer gate. In response to a high-level input signal of the clock terminal (CK), each of the eleventh and twelfth transistors (M11, M12) may be short-circuited to transmit data of the storage node (SN) to the other terminal thereof. Alternatively, in response to a low-level input signal of the clock terminal (CK), each of the eleventh and twelfth transistors (M11, M12) may be opened not to transmit data of the storage node (SN) to the other terminal thereof.

The thirteenth and fourteenth transistors (M13, M14) may constitute an inverter, and may invert data of the other terminal of the second transfer gate and transmit the inverted data to the output terminal (Q).

The fifteenth to eighteenth transistors (M15~M18) may constitute a second feedback circuit. The second feedback circuit may float the other terminal of the second transfer gate in response to a high-level input signal of the clock terminal (CK). Alternatively, the second feedback circuit may invert data of the output terminal (Q) in response to a low-level input signal of the clock terminal (CK), such that the inverted data may be fed back to the other terminal of the second transfer gate. The other terminal of the second transfer gate may be connected to the inverting output terminal (Q').

The counter flip-flop 700 not only includes a NAND gate for initializing data stored in the storage node (SN), but also includes first and second feedback circuits capable of maintaining data stored in the storage node (SN) and data stored in the output terminal (Q) without any loss. After the counter flip-flop 700 stores specific data in the exposure period, the counter flip-flop 700 must maintain the stored data until the next pulse of the charge pulse signal (CP) occurs (especially, the counter flip-flop 700 must maintain the stored data for a very long time under low-illuminance condition), so that the first and second feedback circuits may be helpful to improve data retention performance of the counter flip-flop 700.

Referring to FIG. 7, the counter flip-flop 700 suitable for the counter 220 may include a relatively large number (e.g., 18) of transistors.

Figure 8:
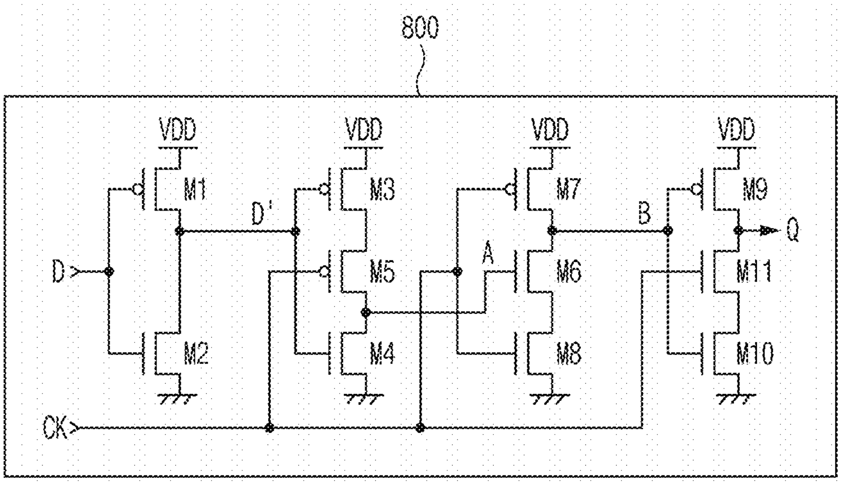
FIG. 8 is a circuit diagram illustrating a register flip-flop based on some embodiments of the present disclosure.

FIG. 8 is a circuit diagram illustrating a register flip-flop based on some embodiments of the present disclosure.

Referring to FIG. 8, the register flip-flop 800 may be an example of each of the register flip-flops (245-1~245-N) shown in FIG. 2.

The register flip-flop 800 may include first to eleventh transistors (M1~M11). Here, the first to eleventh transistors (M1~M11) may be classified into PMOS transistors (M1, M3, M5, M7, M9) and NMOS transistors (M2, M4, M6, M8, M10, M11). In addition, it should be noted that the first to eleventh transistors (M1~M11) of the register flip-flop 800 shown in FIG. 8 are unrelated to the first to eleventh transistors (M1~M11) of the counter flip-flop 700 shown in FIG. 7.

The register flip-flop 800 may correspond to a true single phase clock (TSPC) flip-flop.

The register flip-flop 800 may include first and second transistors (M1, M2) each having a gate terminal connected to an input terminal (D) so as to operate as an inverter, third and fourth transistors (M3, M4) each having a gate terminal connected to a node (D'), fifth, seventh, eighth, and eleventh transistors (M5, M7, M8, M11) each having a gate terminal connected to a clock terminal (CK), a sixth transistor M6 having a gate terminal connected to a node (A), and ninth and tenth transistors (M9, M10) each having a gate terminal connected to a node (B).

When the signal input to the clock terminal (CK) is at a logic low level and the signal input to the input terminal (D) is at a logic high level, the third transistor M3 and the fifth transistor M5 may be turned on and the fourth transistor M4 may be turned off, so that a signal of the node (A) connected to the fifth transistor M5 may be at a logic high level. Accordingly, the sixth transistor M6 may be turned on and the seventh transistor M7 may also be turned on by a signal input to the clock terminal (CK). Additionally, the node (B) connected to the seventh transistor M7 may be precharged to a logic high level.

On the other hand, when the signal input to the clock terminal CK is at a logic low level and the signal input to the input terminal (D) is at a logic low level, a signal of the node A may have a logic low level. Additionally, the sixth transistor M6 may be turned off, the seventh transistor M7 may be turned on by a signal input to the clock terminal (CK), and the node (B) may be precharged to a logic high level.

When the node (B) is precharged as described above, the output terminal (Q) is in a state of latching a previous output value, such that the previous output value can be maintained at the output terminal (Q).

Then, when the signal input to the clock terminal (CK) transitions from a logic low level to a logic high level, it can be determined whether the node (B) will be kept at a precharged logic high level or will be discharged to a logic low level depending on whether the output value of the node (A) is at a logic low level or at a logic high level. As a result, the output terminal (Q) may be determined to be a logic low level or a logic high level depending on whether the node (B) is at a logic high level or at a logic low level.

The register flip-flop 800 may perform the above-described operation, and may output the same data as data input to the input terminal (D) in response to the signal input to the clock terminal (CK).

The register flip-flop 800 of FIG. 8 may include only 11 transistors, the number of which is significantly smaller than the number of transistors included in the counter flip-flop 700 of FIG. 7.

Since the register flip-flop 800 receives initialized data from the counter 220 as described above, the register flip-flop 800 need not perform self-initialization, so that the NAND gate connected to the reset terminal (R) may be unnecessary.

In addition, since the register flip-flop 800 causes circulation of stored data in each suspend section, the register flip-flop 800 only needs to maintain data for a relatively short time as compared to the counter flip-flop 700, making the first and second feedback circuits unnecessary. In addition, as described above, data retention performance required for the register flip-flop 800 may further decrease due to the refresh operation of the shift register 240.

Figure 9:
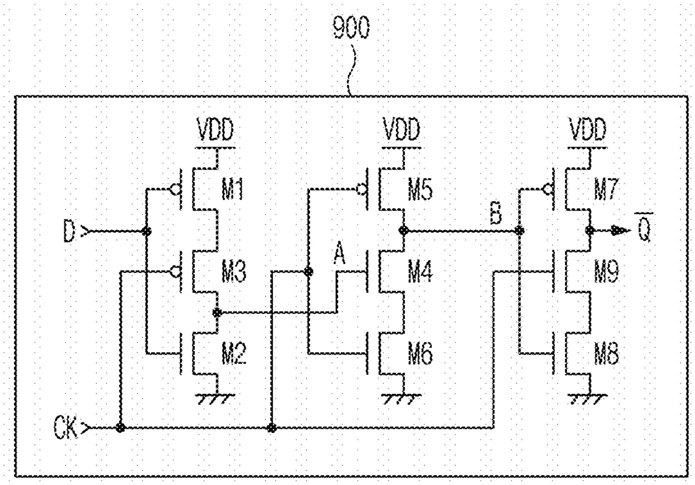
FIG. 9 is a circuit diagram illustrating another register flip-flop based on some embodiments of the present disclosure.

FIG. 9 is a circuit diagram illustrating another register flip-flop based on some embodiments of the present disclosure.

Referring to FIG. 9, the register flip-flop 900 may be implemented as another embodiment of each of the register flip-flops (245-1~245-N) shown in FIG. 2.

The register flip-flop 900 may include first to ninth transistors (M1~M9). Here, the first to ninth transistors (M1~M9) may be classified into PMOS transistors (M1, M3, M5, M7) and NMOS transistors (M2, M4, M6, M8, M9). In addition, the first to ninth transistors (M1~M9) of the register flip-flop 900 shown in FIG. 9 may be substantially identical in structure and function to the third to eleventh transistors (M3~M11) of the register flip-flop 800 shown in FIG. 8.

The register flip-flop 900 may have a structure in which the first and second transistors (M1, M2) corresponding to the inverter are omitted from the register flip-flop 800. The register flip-flop 900 may correspond to an inverting true single phase clock (TSPC) flip-flop.

Since the register flip-flop 900 is substantially the same as the structure and function of the register flip-flop 800 except that the inverter is omitted, redundant descriptions thereof will herein be omitted for brevity.

However, since the register flip-flop 900 does not include an inverter, data input to the input terminal (D) of the register flip-flop 900 may be inverted and output to the output terminal (Q).

Accordingly, the shift register 240 may include an even number of register flip-flops 900 so that the data input to the shift register 240 is not inverted and output as the output signal (SR_OUT) of the shift register 240.

Alternatively, when the shift register 240 includes an odd number of register flip-flops 900, an inverter for inverting data may be additionally placed before or after the odd number of register flip-flops 900.

When the shift register 240 includes a register flip-flop 900 composed of nine transistors, the size of the pixel (PX) can be further reduced.

Figure 10:
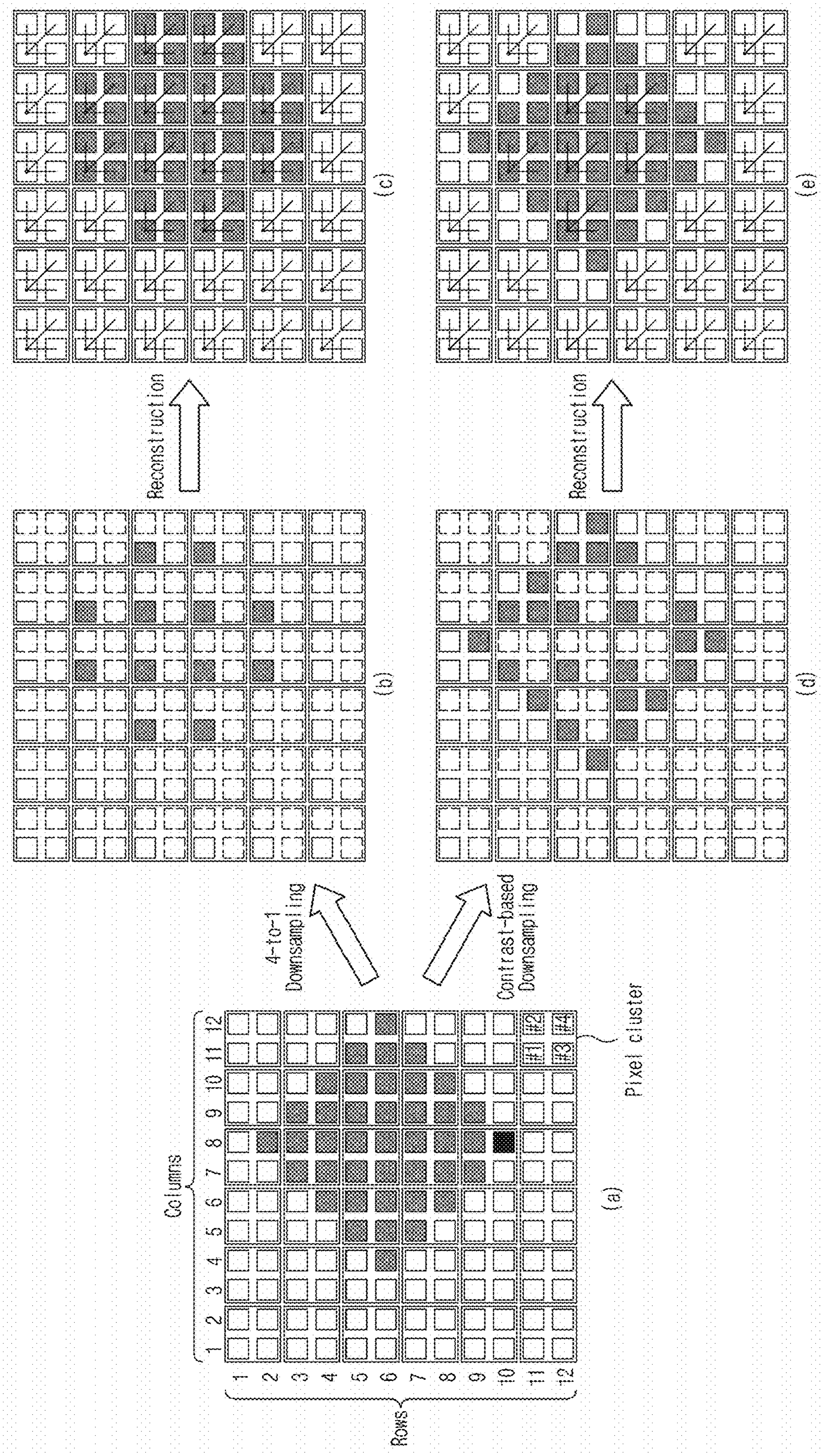
FIG. 10 is a conceptual diagram illustrating a downsampling method of the image sensing device including the pixel of FIG. 2 based on some embodiments of the present disclosure.

FIG. 10 is a conceptual diagram illustrating a downsampling method of the image sensing device including the pixel of FIG. 2 based on some embodiments of the present disclosure.

Referring to FIG. 10, FIG. 10(*a*) illustrates examples of pixels arranged in a matrix including 12 rows and 12 columns, and pixels indicated by shading may be pixels included in a texture indicated by a diamond shape. In FIG. 10(*a*) the pixels included in the texture have a relatively higher average of pixel data than other pixels not included in the texture.

The image sensing device 10 may perform downsampling to reduce the amount of power to be consumed by the pixel array 110. Downsampling may be performed in units of a pixel cluster including multiple pixels (#1~#4) arranged in a (2×2) matrix structure. Such downsampling may mean acquiring pixel data by activating only some pixels determined according to a predetermined rule, rather than acquiring pixel data by activating all pixels included in a pixel cluster.

Although the embodiment of FIG. 10 has disclosed an example case in which the pixel cluster includes four pixels arranged in a (2×2) matrix for convenience of description, other implementations are also possible, and it should be noted that the pixel cluster may include two or more pixels and the two or more pixels may not be adjacent to each other. Additionally, the number of pixels that are downsampled and activated in the pixel cluster may be selected in a range having a smaller number of pixels than the total number of pixels included in the pixel cluster.

The methods shown in FIGS. 10(*b*) and 10(*c*) may correspond to a comparative example (denoted by "4-to-1 downsampling") for the disclosed technology, and the methods shown in FIGS. 10(*d*) and 10(*e*) may correspond to one embodiment of the present disclosure (denoted by "contrast-based downsampling").

First, as can be seen from FIG. 10(*b*), only pixels (e.g., pixels located at the upper-left side of the drawing) located at fixed positions from among pixels included in each pixel cluster may be activated, and the remaining pixels other than the activated pixels may be deactivated, so that only pixels at the fixed positions can generate pixel data. The activated pixels may be denoted by solid lines and the deactivated pixels may be indicated by dotted lines.

Referring to FIG. 10(*c*), according to the 4-to-1 downsampling method, the deactivated pixel included in the same pixel cluster as the activated pixel may be reconstructed to have the same pixel data as the pixel data obtained from the activated pixel. The straight line depicted to interconnect pixels may be a straight line through which pixels (i.e., activated pixels) providing pixel data are connected to other pixels (i.e., deactivated pixels) receiving pixel data in the reconstruction process. The 4-to-1 downsampling method has an advantage of reducing power consumption without additional hardware implementation due to its own relatively simple operation method, but as shown in FIG. 10(*c*), there is a problem in that the shape of a texture may be changed as shown in the result of comparison between the original data in FIG. 10(*a*) and the restored data in FIG. 10(*c*).

Referring to FIG. 10(*d*), it may be determined whether to activate only the pixels located at the upper left side of the pixel cluster or to activate all pixels belonging to the pixel cluster based on a difference (contrast) between the pixel data (i.e., count data) of the pixels included in each pixel cluster. The activated pixels may be denoted by solid lines, and the deactivated pixels may be denoted by dotted lines.

When the difference (contrast) between pixel data within the pixel cluster exceeds a predetermined level, all pixels in the pixel cluster may be activated. On the other hand, when the difference (contrast) between pixel data within the pixel cluster is a predetermined level or less, only some pixels (e.g., pixels located at the upper left side of the pixel cluster) of the pixel cluster may be activated. That is, downsampling may be performed on a pixel cluster where a difference in pixel data between pixels is relatively small, and downsampling may not be performed on a pixel cluster where a difference in pixel data between pixels is relatively large.

As can be seen from FIG. 10(*d*), when the pixel cluster includes not only pixels (e.g., shaded pixels) included in the texture but also other pixels (e.g., white pixels) not included in the texture, a difference in pixel data between pixels within the pixel cluster exceeds a predetermined level, so that all pixels belonging to the pixel cluster can be activated. When the pixel cluster includes only pixels (e.g., shaded pixels) included in the texture or only pixels (e.g., white pixels) not included in the texture, a difference in pixel data between pixels within the pixel cluster may be a predetermined level or less, so that only pixels located at the upper left side of the pixel cluster can generate pixel data.

Referring to FIG. 10(*e*), according to the contrast-based downsampling method, a separate reconstruction operation is not performed on the pixel cluster in which downsampling was not performed, and the same reconstruction operation as those of FIG. 10(*c*) may be performed in the pixel cluster in which downsampling was performed. As shown in FIG. 10(*e*), the contrast-based downsampling method may maintain the same shape of textures by comparing original data of FIG. 10(*a*) with the reconstructed data (i.e., restored data) of FIG. 10(*e*), thereby increasing the quality of images. In addition, downsampling may be selectively applied to pixel clusters with small differences between pixel data, thereby reducing power consumption as much as possible.

Figure 11:
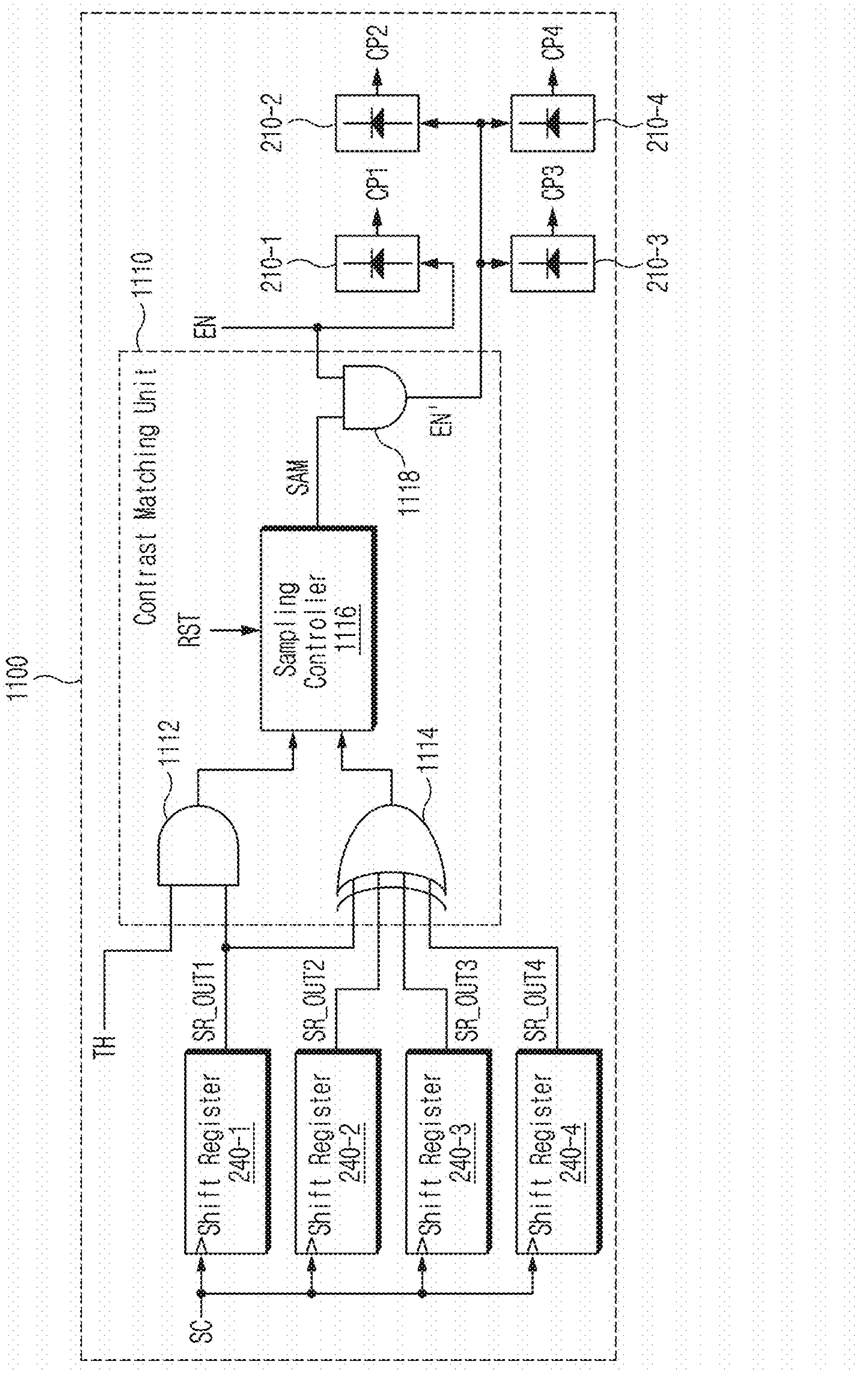
FIG. 11 is a circuit diagram illustrating a pixel cluster in which a contrast-based downsampling method can be performed based on some embodiments of the present disclosure.

FIG. 11 is a circuit diagram illustrating a pixel cluster in which a contrast-based downsampling method can be performed based on some embodiments of the present disclosure.

Referring to FIG. 11, the pixel cluster 1100 may include four pixels (e.g., first to fourth pixels) and a contrast matching unit 1110 that determines whether to apply downsampling to the pixel cluster 1100. FIG. 11 shows some elements directly related to the contrast-based downsampling method from among the constituent elements of the pixel cluster 1100.

The pixel cluster 1100 may include first to fourth light sensors (210-1~210-4), first to fourth shift registers (240-1~240-4), and a contrast matching unit 1110.

The first to fourth light sensors (210-1~210-4) may be included in the first to fourth pixels, respectively. The first to fourth shift registers (240-1~240-4) may be included in the first to fourth pixels, respectively.

The contrast matching unit 1110 may determine whether to perform downsampling on the pixel cluster 1100 based on the output signals (SR_OUT1~SR_OUT4) of the first to fourth shift registers (240-1~240-4).

The contrast matching unit 1110 may include a first AND gate 1112, an exclusive OR (XOR) gate 1114, a sampling controller 1116, and a second AND gate 1118.

The first AND gate 1112 may transmit the result (hereinafter referred to as a multiplication result) of multiplying the output signal (SR_OUT1) of the first shift register 240-1 by a threshold value (TH) to the sampling controller 1116. The threshold value (TH) may be a reference value for determining whether the output signal (SR_OUT1) of the first shift register 240-1 is a valid value, and may be a bit string other than M number of lower bits from among bit strings, the number of which corresponds to a number equal to 2 to the power of 'P', where P is a natural number greater than M and less than or equal to N. That is, the output signal (SR_OUT1) of the first shift register 240-1 may sequentially change from the first bit (UB[0]) to the N-th bit (UB[N−1]). In response to such sequential change, the threshold value (TH) may also be sequentially changed in the direction from a bit corresponding to the first bit (UB[0]) to a bit corresponding to the N-th bit (UB[N−1]).

The XOR gate 1114 may receive the output signals (SR_OUT1~SR_OUT4) of the first to fourth shift registers (240-1~240-4), may perform XOR operation on the received signals, and may transmit the result of XOR operation (hereinafter referred to as "XOR result") to the sampling controller 1116. Here, the XOR operation on the output signals (SR_OUT1~SR_OUT4) of the first to fourth shift registers (240-1~240-4) may be performed sequentially in units of a bit. For example, after an XOR operation is performed on the first bit (UB[0]) of the second count data (UB), an XOR operation may be performed on the second bit (UB[1]) of the second count data (UB).

If the output signals (SR_OUT1~SR_OUT4) of the first to fourth shift registers (240-1~240-4) all have the same value, the XOR result may be zero '0'. In contrast, when at least one of the output signals (SR_OUT1~SR_OUT4) of the first to fourth shift registers (240-1~240-4) has a different value, the XOR result may be '1'.

The sampling controller 1116 may be initialized by a counter reset signal (RST). The sampling controller 1116 generates a sampling control signal (SAM) that determines whether to perform a downsampling operation based on not only a multiplication result received from the first AND gate 1112, but also the XOR result received from the XOR gate 1114.

The sampling controller 1116 may determine whether the output signal (SR_OUT1) of the first shift register 240-1 is a valid value according to the multiplication result received from the first AND gate 1112. A valid condition for determining the validity of the output signal (SR_OUT1) of the first shift register 240-1 may be a condition that the output signal (SR_OUT1) of the first shift register 240-1 is greater than the threshold value (TH).

When it is determined that the output signal (SR_OUT1) of the first shift register 240-1 is not a valid value, the sampling controller 1116 may generate a sampling control signal (SAM) corresponding to the value of '1' regardless of the XOR result, and may transmit the sampling control signal (SAM) to the second AND gate 1118.

When it is determined that the output signal (SR_OUT1) of the first shift register 240-1 is a valid value, the sampling controller 1116 may generate a sampling control signal (SAM) according to the XOR result and transmit the sampling control signal (SAM) to the second AND gate 1118. Namely, when the XOR result for the entire second count data (UB) is zero '0' (e.g., a cumulative sum value of the XOR result is 0), the sampling controller 1116 may generate the sampling control signal (SAM) corresponding to zero '0'. Conversely, when the XOR result for at least one bit of the second count data (UB) is '1' (e.g., a cumulative sum of the XOR results is a value of 1 or greater), the sampling controller 1116 may generate a sampling control signal (SAM) corresponding to the value of 1.

The second AND gate 1118 may transmit, to the second to fourth light sensors (210-2~210-4), an activation control signal (EN') indicating the result of performing a multiplication operation between an activation control signal (EN) and the sampling control signal (SAM).

Each of the second to fourth light sensors (210-2~210-4) may stop generating the charge pulse signal (CP) in response to the activation control signal (EN') of 0. In addition, each of the second to fourth light sensors (210-2~210-4) may generate the charge pulse signal (CP) in response to the activation control signal (EN') of 1 in the same manner as in the first light sensor 210-1.

When the output signal (SR_OUT1) of the first shift register (240-1) is equal to or greater than a predetermined value, and the second count data (UB) values output from the first to fourth shift registers (240-1~240-4) are completely equal to each other, the contrast matching unit 1110 may perform downsampling to deactivate the second to fourth light sensors (210-2~210-4).

If the above-described conditions are not satisfied, the contrast matching unit 1110 may activate the second to fourth light sensors (210-2~210-4) to perform sampling on all pixels belonging to the pixel cluster 1100.

In the disclosed technology, the reason for using the second count data (UB) to determine whether to perform downsampling is because the first count data (LB) includes a large amount of noise components such as shot noise and is considered inappropriate for determining the presence or absence of data similarity between pixels.

Figure 12:
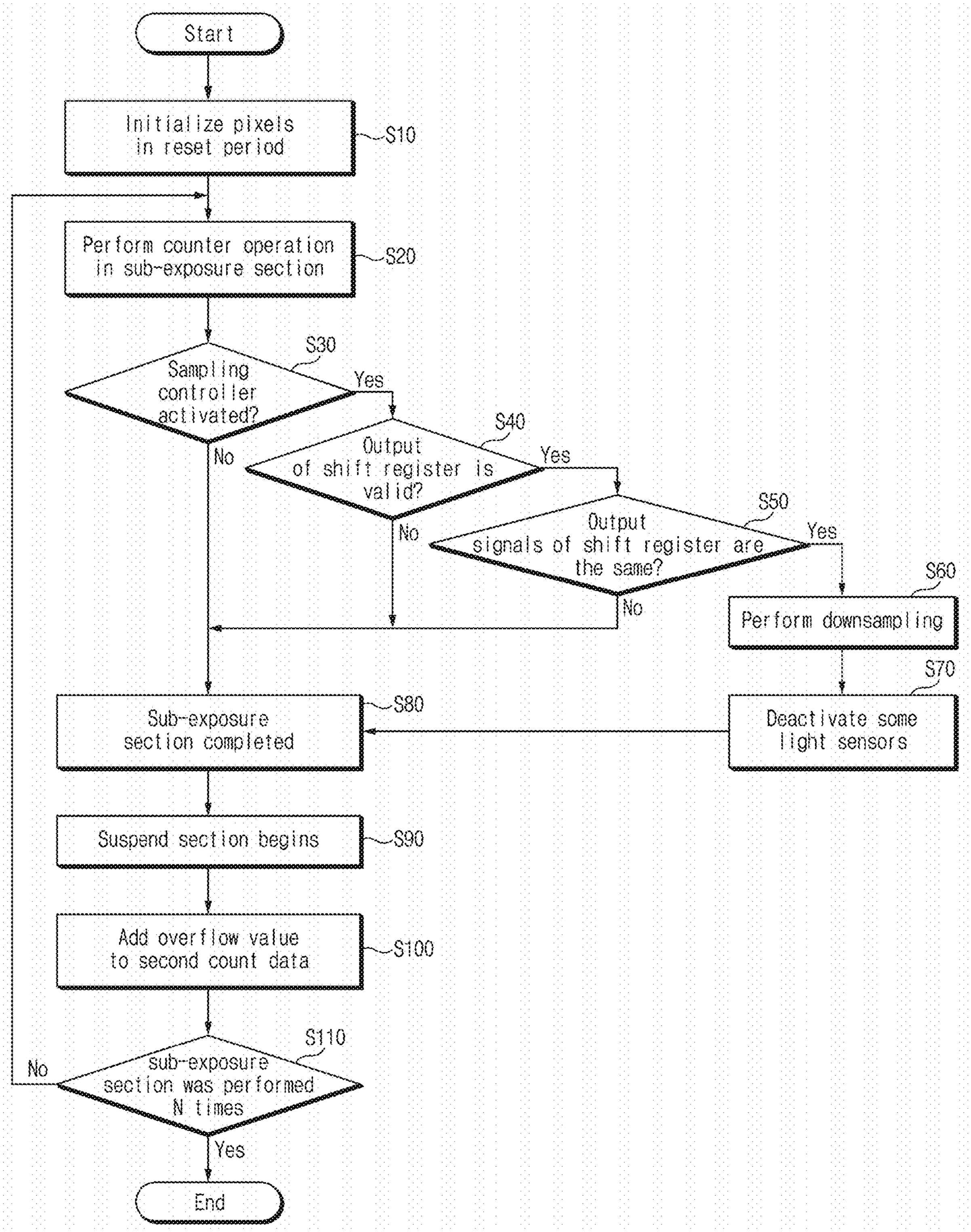
FIG. 12 is a flowchart illustrating an operation of the pixel cluster shown in FIG. 11 based on some embodiments of the present disclosure.

FIG. 12 is a flowchart illustrating an operation of the pixel cluster shown in FIG. 11 based on some embodiments of the present disclosure.

In FIG. 12, the first to fourth pixels included in the pixel cluster 1100 can simultaneously perform operation of the reset period, operation of the exposure period, and operation of the readout period within the same frame.

First, in the reset period, first and second count data (LB, UB), an overflow value (OF), a carry value (CARRY), and a summation value (SUM) stored in each of the first to fourth pixels may be initialized to a logic low level, not only a sub-exposure counter value indicating how many times the operation of the sub-exposure section was performed, but also data stored in the sampling controller 1116 may be initialized (S10). Here, the sub-exposure counter value may be a value stored in the timing generator 140.

In the sub-exposure section, the counter may generate and store the first count data (LB) by counting pulses of the charge pulse signal (CP) output from the light sensor, and the adder may generate and store the overflow value (OF) indicating whether the first count data (LB) has overflowed (S20).

The timing generator 140 may control whether to activate the sampling controller 1116 according to a request from an external device (e.g., an image signal processor) (S30).

If the sampling controller 1116 is deactivated ('No' in S30), operations S40 to S70 may not be performed and operation S80 may be performed.

If the sampling controller 1116 is activated ('Yes' in S30), the sampling controller 1116 may determine whether the output signal (SR_OUT1) of the first shift register 240-1 is a valid value according to the multiplication result received from the first AND gate 1112 (S40).

When it is determined that the output signal (SR_OUT1) of the first shift register 240-1 is not a valid value ('No' in S40), the sampling controller 1116 may generate a sampling control signal (SAM) corresponding to the value of 1 regardless of the XOR result, and may transmit the sampling control signal (SAM) to the second AND gate 1118 to activate the second to fourth light sensors (210-2~210-4), so that operation S80 can be performed.

When it is determined that the output signal (SR_OUT1) of the first shift register 240-1 is a valid value ('Yes' in S40), the sampling controller 1116 may determine whether the output signals (SR_OUT1~SR_OUT4) of the shift registers (240-1~240-4) are identical to each other according to the result of XOR operation (S50).

If the XOR result for at least one bit of the second count data (UB) is '1' (e.g., a cumulative sum value of the XOR result is 1 or greater), the sampling controller 1116 may determine that values of the second count data (UB) of the shift registers (240-1~240-4) are different from each other (No in S50), may generate a sampling control signal (SAM) corresponding to the value of 1, and may transmit the sampling control signal (SAM) to the second AND gate 1118 to activate the second to fourth light sensors (210-2~210-4), so that operation S80 can be performed.

When the XOR result for the entire second count data (UB) is zero '0' (e.g., a cumulative sum value of the XOR result is zero '0'), the sampling controller 1116 may determine whether values of the second count data (UB) of the shift registers (240-1~240-4) are identical to each other ('Yes' in S50), may generate a sampling control signal (SAM) corresponding to zero '0', may transmit the sampling control signal (SAM) to the second AND gate 1118, and may thus perform downsampling to deactivate the second to fourth light sensors (210-2~210-4) (S60, S70).

When the operation of the sub-exposure section is completed (S80), in the suspend section, the operation of the light sensor and the operation of the counter may be stopped (S80), and the adder may sum the second count data (UB) stored in the shift register and the overflow value (OF), and may store the second count data corresponding to the summation result to the shift register (S90, S100).

The timing generator 140 may determine whether the sub-exposure section has been performed N times by referring to a sub-exposure counter value indicating the number of times the sub-exposure section has been performed (S110).

If the operation of the sub-exposure section has been performed less than N times ('No' in S110), operation S20 may be performed again.

If the operation of the sub-exposure section has been performed N times ('Yes' in S110), the pixel cluster 1100 can proceed to the readout section.

As is apparent from the above description, the image sensing device based on some embodiments of the present disclosure can significantly reduce the size of a pixel generating pixel data by counting the number of pulses corresponding to photocharges.

In addition, the image sensing device based on some embodiments of the present disclosure can reduce the amount of power to be consumed in a pixel array by performing contrast-based downsampling on a pixel cluster including pixels.

The embodiments of the present disclosure may provide a variety of effects capable of being directly or indirectly recognized.

Although a number of illustrative embodiments have been described, it should be understood that modifications and enhancements to the disclosed embodiments and other embodiments can be devised based on what is described and/or illustrated in the present disclosure. Furthermore, the embodiments may be combined to form additional embodiments.

What is claimed is:

1. An image sensing device comprising:

a counter configured to generate first count data by counting pulses generated by detection of photocharges;

a shift register configured to store second count data corresponding to upper digits of the first count data; and an adder configured to sum the second count data and an overflow value indicating whether the first count data has overflowed.

2. The image sensing device according to claim 1, further comprising a light sensor configured to generate a charge pulse signal including the pulses.

3. The image sensing device according to claim 1, wherein the counter, the shift register, and the adder correspond to one pixel.

4. The image sensing device according to claim 3, wherein the pixel operates in different ways according to a reset period, an exposure period, and a readout period, and wherein:

the reset period is used to initialize data stored in the pixel, the exposure period is used to generate pixel data including the first count data and the second count data by counting the pulses, and the readout period is used to output the pixel data to a column line.

5. The image sensing device according to claim 4, wherein, in the reset period, the counter is configured to initialize the first count data in response to a counter reset signal of a logic high level.

6. The image sensing device according to claim 5, wherein the counter includes at least one counter flip-flop configured to have a reset terminal for receiving the counter reset signal.

7. The image sensing device according to claim 6, wherein the shift register includes at least one register flip-flop configured not to include the reset terminal.

8. The image sensing device according to claim 7, wherein the shift register further includes a register switch configured to selectively connect an output node of the counter flip-flop and an output node of the register flip-flop to each other.

9. The image sensing device according to claim 8, wherein the register switch is configured to transmit, to the register flip-flop, an output signal of the counter flip-flop initialized according to the counter reset signal.

10. The image sensing device according to claim 4, wherein the exposure period includes:

a sub-exposure section used to generate the first count data; and a suspend section used to generate the second count data.

11. The image sensing device according to claim 10, wherein:

the counter is configured to generate, in the sub-exposure section, the first count data by counting the pulses; and the adder is configured to generate, in the sub-exposure section, the overflow value depending on whether a most significant bit (MSB) of the first count data transitions from a logic high level to a logic low level.

12. The image sensing device according to claim 10, wherein the shift register is configured to perform, in the sub-exposure section, a refresh operation by shifting the second count data through the adder.

13. The image sensing device according to claim 10, wherein:

the counter is configured to stop, in the suspend section, generating the first count data, and the adder is configured to sequentially add, in the suspend section, the overflow value to bits ranging from a least significant bit (LSB) to a most significant bit (MSB) of the second count data.

14. The image sensing device according to claim 4, wherein the shift register sequentially outputs the second count data, receives the first count data from the counter, and thus sequentially outputs the first count data, in the readout period.

15. The image sensing device according to claim 1, further comprising a pixel cluster including a plurality of pixels adjacent to each other, wherein each of the plurality of pixels includes the counter, the shift register, and the adder.

16. The image sensing device according to claim 15, wherein the pixel cluster further includes a contrast matching unit configured to perform a downsampling operation of the pixel cluster depending on whether values of second count data of the plurality of pixels are identical to each other.

17. The image sensing device according to claim 16, wherein, when the values of the second count data of the plurality of pixels are identical to each other, the contrast matching unit is configured to deactivate some pixels from among the plurality of pixels.

18. An image sensing device comprising:

a counter configured to generate first count data by counting pulses corresponding to photocharges; and an adder configured to generate an overflow value indicating whether the first count data has overflowed, and configured to add the overflow value to second count data corresponding to upper digits of the first count data.

19. An image sensing device comprising:

a counter configured to generate first count data by counting pulses corresponding to photocharges; and a shift register configured to store second count data corresponding to upper digits of the first count data, configured to receive the first count data after outputting the second count data, and configured to output the received first count data, wherein the second count data refers to data to which an overflow value indicating whether the first count data has overflowed is added.

20. The image sensing device according to claim 19, wherein the shift register is configured to perform a refresh operation of the second count data while the first count data is generated.

* * * * *